US012094397B2

(12) United States Patent
Kwon et al.

(10) Patent No.: US 12,094,397 B2
(45) Date of Patent: Sep. 17, 2024

(54) ELECTROLUMINESCENCE DISPLAY APPARATUS

(71) Applicant: LG Display Co., Ltd., Seoul (KR)

(72) Inventors: Yong Chul Kwon, Seoul (KR); Jung Jae Kim, Goyang-si (KR); Nam Kon Ko, Seoul (KR); Dong Won Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 120 days.

(21) Appl. No.: 17/522,683

(22) Filed: Nov. 9, 2021

(65) Prior Publication Data

US 2022/0180800 A1 Jun. 9, 2022

(30) Foreign Application Priority Data

Dec. 8, 2020 (KR) ........................ 10-2020-0170583

(51) Int. Cl.
*G09G 3/32* (2016.01)

(52) U.S. Cl.
CPC ....... *G09G 3/32* (2013.01); *G09G 2300/0842* (2013.01); *G09G 2310/0291* (2013.01); *G09G 2310/08* (2013.01); *G09G 2320/0223* (2013.01); *G09G 2330/025* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 9,837,018 | B2 | 12/2017 | Lee et al. | |
| 11,107,397 | B2 | 8/2021 | Sung | |
| 2011/0242087 | A1* | 10/2011 | Ebisuno | G09G 3/3233 345/212 |

(Continued)

FOREIGN PATENT DOCUMENTS

| | | | |
|---|---|---|---|
| CN | 103927959 | A | 7/2014 |
| CN | 111179845 | A | 5/2020 |

(Continued)

OTHER PUBLICATIONS

China National Intellectual Property Administration, Office Action, Chinese Patent Application No. 202111315286.9, Dec. 21, 2023, eight pages.

(Continued)

*Primary Examiner* — Benjamin X Casarez
(74) *Attorney, Agent, or Firm* — Fenwick & West LLP

(57) ABSTRACT

An electroluminescence display apparatus includes a display panel including a plurality of pixels connected to a first power line, a power circuit converting a final feedback driving voltage input through a first input terminal thereof to output a high level driving voltage to a first position of the first power line through a first output terminal thereof, and a feedback control circuit receiving the high level driving voltage as a first feedback driving voltage, receiving a second feedback driving voltage from a second position of the first power line, and supplying the first input terminal of the power circuit with the final feedback driving voltage adjusted based on a first output contribution rate of the first feedback driving voltage and a second output contribution rate of the second feedback driving voltage.

16 Claims, 16 Drawing Sheets

(56) References Cited

U.S. PATENT DOCUMENTS

| | | | | |
|---|---|---|---|---|
| 2013/0106676 | A1* | 5/2013 | Ono | G09G 3/3233<br>345/76 |
| 2013/0235010 | A1* | 9/2013 | Park | H05B 47/25<br>345/212 |
| 2013/0241808 | A1* | 9/2013 | Kwon | G05F 1/24<br>323/284 |
| 2014/0312799 | A1* | 10/2014 | Kim | G09G 3/3233<br>315/240 |
| 2016/0049111 | A1* | 2/2016 | Lee | G09G 3/3291<br>345/691 |
| 2016/0086542 | A1* | 3/2016 | Lee | G09G 3/3225<br>345/212 |
| 2020/0072956 | A1 | 3/2020 | Lee | |
| 2020/0090572 | A1* | 3/2020 | Wu | G09G 3/20 |
| 2020/0152121 | A1 | 5/2020 | Sung | |
| 2021/0174742 | A1* | 6/2021 | Hwang | G09G 3/3233 |
| 2021/0201784 | A1* | 7/2021 | Kim | G09G 3/2003 |

FOREIGN PATENT DOCUMENTS

| | | | | | |
|---|---|---|---|---|---|
| KR | 10-2016-0036132 | A | | 4/2016 | |
| KR | 10-2019-0023859 | A | | 3/2019 | |
| KR | 20190046135 | A | * | 5/2019 | G09G 3/3233 |
| KR | 10-2019-0122639 | A | | 10/2019 | |
| KR | 20200072956 | A | * | 6/2020 | G09G 5/10 |

OTHER PUBLICATIONS

Korean Intellectual Property Office, Office Action, Korean Patent Application No. 10-2020-0170583, Mar. 23, 2024, 13 pages.

* cited by examiner

ELECTROLUMINESCENCE DISPLAY APPARATUS

This application claims the benefit of Republic of Korea Patent Application No. 10-2020-0170583, filed on Dec. 8, 2020, which is hereby incorporated by reference in its entirety.

BACKGROUND

Field of the Technology

The present disclosure relates to an electroluminescence display apparatus.

Discussion of the Related Art

Electroluminescence display apparatuses include a plurality of pixels arranged as a matrix type, and a light emitting device included in each of the pixels emits light on the basis of image data to display luminance. To this end, each pixel may be supplied with a high level driving voltage and an initialization voltage.

Due to dynamic voltage (IR) drop occurring in a power line, a level of a high level driving voltage applied to a pixel varies based on a pixel position, causing an image quality deviation (i.e., a luminance deviation and a color deviation) between pixels.

Technology for predicting IR drop to perform compensation on the basis of a data voltage may be considered for reducing an image quality deviation between pixels, but because such compensation technology is based on prediction, the accuracy of compensation is low and the chip cost increases. Also, the compensation technology uses a method of lowering a data voltage with respect to a position at which luminance is the lowest, causing a reduction in screen luminance.

In a screen of each electroluminescence display apparatus, there is a problem where a luminance deviation between a region including a notch and a region including no notch occurs. Such a luminance deviation occurs due to a ripple deviation of the initialization voltage occurring between the regions.

SUMMARY

To overcome the aforementioned problem of the related art, the present disclosure may provide an electroluminescence display apparatus for reducing an image quality deviation caused by IR drop occurring in a high level driving voltage power line.

Moreover, the present disclosure may provide an electroluminescence display apparatus for reducing an image quality deviation, caused by IR drop occurring in a high level driving voltage power line, and decreasing a luminance deviation caused by a ripple deviation of an initialization voltage occurring between a region including a notch and a region including no notch.

To achieve these objects and other advantages and in accordance with the purpose of the disclosure, as embodied and broadly described herein, an electroluminescence display apparatus includes a display panel including a plurality of pixels connected to a first power line, an EVDD power circuit converting a final feedback driving voltage input through a first input terminal thereof to output a high level driving voltage to a first position of the first power line through a first output terminal thereof, and a feedback control circuit receiving the high level driving voltage as a first feedback driving voltage, receiving a second feedback driving voltage from a second position of the first power line, and supplying the first input terminal of the EVDD power circuit with the final feedback driving voltage adjusted based on a first output contribution rate of the first feedback driving voltage and a second output contribution rate of the second feedback driving voltage, wherein dynamic voltage (IR) drop at the second position of the first power line is greater than IR drop at the first position of the first power line, and an output of the high level driving voltage increases in a vertical active period where a data application scan signal is supplied to the display panel.

In another aspect of the present disclosure, an electroluminescence display apparatus includes a display panel including a plurality of pixels connected to a first power line and a second power line, a common power circuit converting a final feedback driving voltage input through a first input terminal thereof to output a high level driving voltage to a first position of the first power line through a first output terminal thereof, receiving a feedback initialization voltage from a third position of the second power line through a second input terminal thereof, and converting the feedback initialization voltage to output an initialization voltage to a fourth position of the second power line through a second output terminal thereof, and a feedback control circuit receiving the high level driving voltage as a first feedback driving voltage, receiving a second feedback driving voltage from a second position of the first power line, and supplying the first input terminal of the common power circuit with the final feedback driving voltage adjusted based on a first output contribution rate of the first feedback driving voltage and a second output contribution rate of the second feedback driving voltage, wherein dynamic voltage (IR) drop at the second position of the first power line is greater than IR drop at the first position of the first power line, the number of horizontal-line pixels of the display panel corresponding to the third position is less than the number of horizontal-line pixels of the display panel corresponding to the fourth position, and an output of the high level driving voltage increases in a vertical active period where a data application scan signal is supplied to the display panel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
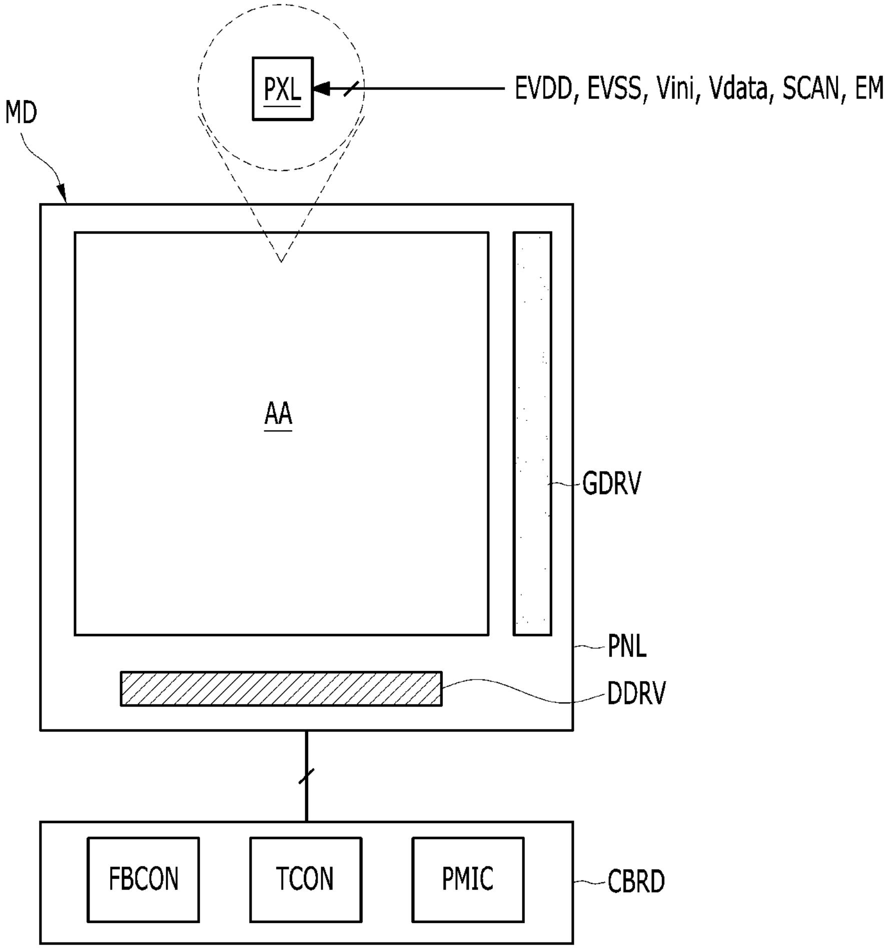
FIG. 1 is a block diagram illustrating an electroluminescence display apparatus according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on-”, “over-”, “under-”, and “next-”, one or more other parts may be disposed between the two parts unless “just” or “direct” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Hereinafter, embodiments of the present disclosure will be described in detail with reference to the accompanying drawings. In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating an electroluminescence display apparatus according to an embodiment of the present disclosure.

Referring to FIG. 1, the electroluminescence display apparatus according to an embodiment of the present disclosure may be a display module MD which includes a display panel PNL, a panel driving circuit, a timing control circuit TCON, a feedback control circuit FBCON, and a power generating circuit PMIC are coupled to one another.

The display panel PNL may include a plurality of signal lines (data lines and gate lines), which intersect with one another, and a pixel array configured with a plurality of pixels arranged as a matrix type. Each of the pixels PXL may include a light emitting device and a driving element. The light emitting device may be implemented with an organic light emitting diode or an inorganic light emitting diode, and the driving element may be implemented with a transistor based on silicon or oxide.

The display panel PNL may include an active area AA including the pixel array and a non-display area outside the active area AA. The pixel array may include a first power line which transfers a high level driving voltage EVDD to the pixels PXL and a second power line which transfers an initialization voltage Vini to the pixels PXL.

The pixels PXL may include a plurality of red pixels, a plurality of green pixels, a plurality of blue pixels, and a plurality of white pixels. The red pixel, the green pixel, the blue pixel, and the white pixel may configure one unit pixel for implementing a color. A color implemented in a unit pixel may be determined based on an emission rate of each of the red pixel, the green pixel, the blue pixel, and the white pixel. Also, the white pixel may be omitted in the unit pixel. A data line, a gate line, a first power line, and a second power line may be connected to each of the pixels PXL.

The panel driving circuit may include a data driver DDRV connected to the data lines of the display panel PNL and a gate driver GDRV connected to the gate lines of the display panel PNL.

The data driver DDRV may convert input image data, received from the timing control circuit TCON, into a data voltage Vdata and may supply the data voltage Vdata to the data lines. The data driver DDRV may output the data voltage Vdata by using a digital-to-analog converter (DAC) which converts the input image data into a gamma compensation voltage. The data driver DDRV may be manufactured as a chip type and may be directly mounted in the non-display area of the display panel PNL, and moreover, may be manufactured as an integrated circuit (IC) type and may be bonded to the display panel PNL through a conductive film.

The gate driver GDRV may generate a data application scan signal SCAN and may supply the data application scan signal SCAN to a plurality of first gate lines. The data application scan signal SCAN may be selected pixels PXL, which are to be charged with the data voltage Vdata, by horizontal pixel line units. When an emission signal EM is further needed based on a pixel PXL structure, the gate driver GDRV may further generate the emission signal EM and may supply the emission signal EM to a plurality of second gate lines. The emission signal EM may determine an emission period of the pixel PXL in one frame.

The gate driver GDRV may be directly provided in the non-display area of the display panel PNL along with the pixel array through a gate-driver in panel (GIP) process, and moreover, may be manufactured as an IC type and may be bonded to the display panel PNL through a conductive film.

The timing control circuit TCON may receive digital data of an input image and a timing signal synchronized therewith from a host system. The timing signal may include a vertical synchronization signal Vsync, a horizontal synchronization signal Hsync, and a data enable signal DE. The host system may be one of a television (TV) system, a set-top box, a navigation system, a DVD player, a Blu-ray player, a personal computer (PC), a home theater system, and a phone system, but is not limited thereto.

The timing control circuit TCON may generate a data timing control signal for controlling an operation timing of the data driver DDRV and a gate timing control signal for controlling an operation timing of the gate driver GDRV, on the basis of the timing signal Vsync, Hsync, and DE. The timing control circuit TCON may further generate the MUX control signal used to compensate for an image quality deviation on the basis of the timing signal Vsync, Hsync, and DE (see FIGS. 15 and 16).

The feedback control circuit FBCON may receive a first feedback driving voltage at a first position, at which IR drop is relatively small, of a first power line, receive a second feedback driving voltage at a second position, at which IR drop is relatively large, of the first power line, and appropriately process the first and second feedback driving voltages to output a final feedback driving voltage corresponding to a third position of the first power line. Here, the third position may be between the first position and the second position, and IR drop at the third position may be greater than IR drop at the first position and less than IR drop at the second position.

The power generating circuit PMIC may include an EVDD power circuit implemented with a DC-DC converter. The EVDD power circuit may convert the final feedback driving voltage input from the feedback control circuit FBCON to output the high level driving voltage EVDD to the first position of the first power line. Particularly, in order to decrease an image quality deviation caused by IR drop occurring in the first power line, the power generating circuit PMIC may progressively increase an output of the high level driving voltage EVDD in a vertical active period where the data application scan signal SCAN is supplied, and thus, the final feedback driving voltage may be shifted to a certain target voltage level or may be within a target voltage range including the certain target voltage level.

The power generating circuit PMIC may further include a Vini power circuit implemented with a DC-DC converter. The Vini power circuit may receive a feedback initialization voltage from a third position of the second power line and may convert the feedback initialization voltage to output the initialization voltage Vini to a fourth position of the second power line. One of the third position and the fourth position may correspond to a region including a notch, and the other of the third position and the fourth position may correspond to a region including no notch. Therefore, a luminance deviation caused by a ripple deviation of the initialization voltage occurring between the region including a notch and the region including no notch may be reduced.

In the power generating circuit PMIC, the EVDD power circuit and the Vini power circuit may be independently configured, or may be integrated.

The timing control circuit TCON, the feedback control circuit FBCON, and the power generating circuit PMIC may be mounted on a control board CBRD, but are not limited thereto. The timing control circuit TCON and the data driver DDRV may be provided as one chip and may be mounted on the display panel PNL, and some elements of the feedback control circuit FBCON may be mounted on the display panel PNL.

Figure 2:
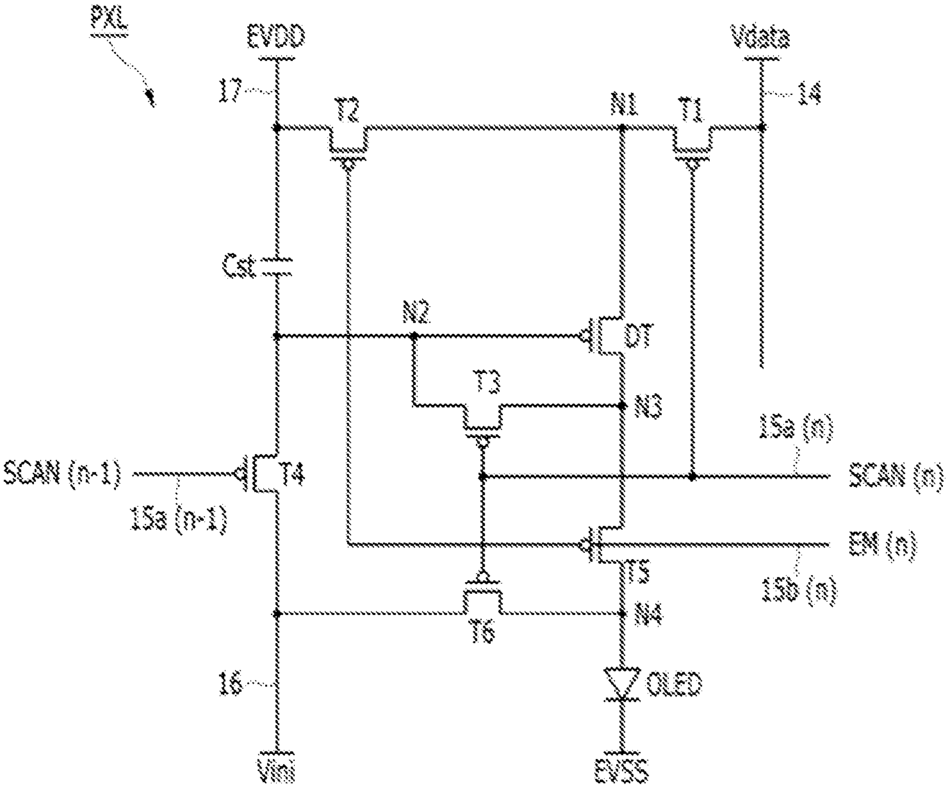
FIG. 2 is a diagram illustrating an embodiment of an equivalent circuit of a pixel of an electroluminescence display apparatus.

FIG. 2 is a diagram illustrating an embodiment of an equivalent circuit of a pixel of an electroluminescence display apparatus.

Referring to FIG. 2, a pixel PXL according to an embodiment of the present disclosure may include an organic light emitting diode OLED, a plurality of thin film transistors (TFTs) (switch TFTs T1 to T6 and a driving TFT DT), and a storage capacitor Cst. The TFTs T1 to T6 and DT may each be implemented as a P-channel TFT including a low temperature polysilicon, and thus, may secure a desired response characteristic. However, the inventive concept is not limited thereto. For example, at least one TFT of a plurality of switch TFTs (for example, first to sixth switch TFTs) T1 to T6 may be implemented as an N-channel TFT including oxide having a good off current characteristic, and the other TFTs may each be implemented as a P-channel TFT including low temperature polysilicon having a good response characteristic.

The OLED may be a light emitting device which emits light with a driving current. An anode electrode of the OLED may be connected to a node N4, and a cathode electrode of the OLED may be connected to an input terminal of a low level driving voltage EVSS. An organic compound layer may be provided between the anode electrode and the cathode electrode of the OLED.

A driving TFT DT may be a driving element which adjusts a driving current flowing in the OLED on the basis of a gate-source voltage thereof. The driving TFT DT may include a gate electrode connected to a node N2, a first electrode connected to a node N1, and a second electrode connected to a node N3.

The first switch TFT T1 may be a switch element which is connected between a data line 14 and the node N1 and is turned on based on an $n^{th}$ scan signal SCAN(n). A gate electrode of the first switch TFT T1 may be connected to an nth first gate line 15*a*(*n*) to which the nth scan signal SCAN (n) is applied, a first electrode of the first switch TFT T1 may be connected to the data line 14, and a second electrode of the first switch TFT T1 may be connected to the node N1.

The second switch TFT T2 may be a switch element which is connected between a first power line 17 and the node N1 and is turned on based on an $n^{th}$ emission signal EM(n). A gate electrode of the second switch TFT T2 may be connected to an $n^{th}$ second gate line 15*b*(*n*) to which the $n^{th}$ emission signal EM(n) is applied, a first electrode of the second switch TFT T2 may be connected to the first power line 17, and a second electrode of the second switch TFT T2 may be connected to the node N1.

The third switch TFT T3 may be a switch element which is connected between the node N2 and the node N3 and is turned on based on the $n^{th}$ scan signal SCAN(n). A gate electrode of the third switch TFT T3 may be connected to the $n^{th}$ first gate line 15*a*(*n*) to which the $n^{th}$ scan signal SCAN (n) is applied, a first electrode of the third switch TFT T3 may be connected to the node N3, and a second electrode of the third switch TFT T3 may be connected to the node N2.

The fourth switch TFT T4 may be a switch element which is connected between the node N2 and a second power line 16 and is turned on based on an $n-1^{th}$ scan signal SCAN (n−1). A gate electrode of the fourth switch TFT T4 may be connected to an n-first gate line 15a(n−1) to which the n−1th scan signal SCAN(n−1) is applied, a first electrode of the fourth switch TFT T4 may be connected to the node N2, and a second electrode of the fourth switch TFT T4 may be connected to the second power line 16.

The fifth switch TFT T5 may be a switch element which is connected between the node N3 and the node N4 and is turned on based on the nth emission signal EM(n). A gate electrode of the fifth switch TFT T5 may be connected to the nth second gate line 15b(n) to which the nth emission signal EM(n) is applied, a first electrode of the fifth switch TFT T5 may be connected to the node N3, and a second electrode of the fifth switch TFT T5 may be connected to the node N4.

The sixth switch TFT T6 may be a switch element which is connected between the node N4 and the second power line 16 and is turned on based on the nth scan signal SCAN(n). A gate electrode of the sixth switch TFT T6 may be connected to the nth first gate line 15a(n) to which the nth scan signal SCAN(n) is applied, a first electrode of the sixth switch TFT T6 may be connected to the node N4, and a second electrode of the sixth switch TFT T6 may be connected to the second power line 16.

The storage capacitor Cst may be connected between the first power line 17 and the node N2.

The pixel PXL of FIG. 2 may operate in the order of an initialization period, a sampling period, an emission period, and a pulse width modulation (PWM) driving period.

In the initialization period, the node N2 may be reset to an initialization voltage Vini, and voltages of floated nodes N1 and N3 may be voltages which are lower than a high level driving voltage EVDD.

In the sampling period, a threshold voltage Vth of the driving TFT DT may be sampled and may be stored in the node N2 and the node N3. During the sampling period, a gate-source voltage of the driving TFT DT may be a threshold voltage of the driving TFT DT.

In the emission period, the OLED may emit light with a driving current which flows in the driving TFT DT.

In the PWM driving period, the light emission of the OLED may stop. In one frame, an emission duty may be determined based on a length of the PWM driving period. When the OLED is repeatedly turned on or off at a certain emission duty ratio, an afterimage may be minimized in implementing a low gray level.

The technical spirit of the present disclosure is not limited to the pixel PXL structure of FIG. 2. The technical spirit of the present disclosure may be applied to a pixel PXL structure which is supplied with the high level driving voltage EVDD through the first power line 17 and is supplied with the initialization voltage Vini through the second power line 16.

The technical spirit of the present disclosure may reduce an image quality deviation caused by IR drop occurring in a high level driving voltage power line (i.e., the first power line). Furthermore, the technical spirit of the present disclosure may further decrease a luminance deviation caused by a ripple deviation of the initialization voltage Vini occurring between a region including a notch and a region including no notch. The technical spirit of the present disclosure may be implemented by a compensation system according to various embodiments which will be described below.

First to fourth embodiments may reduce an image quality deviation caused by IR drop, and fifth to ninth embodiments may decrease all of an image quality deviation caused by the IR drop of the high level driving voltage and the luminance deviation caused by the ripple deviation of the initialization voltage.

First Embodiment

Figure 3:
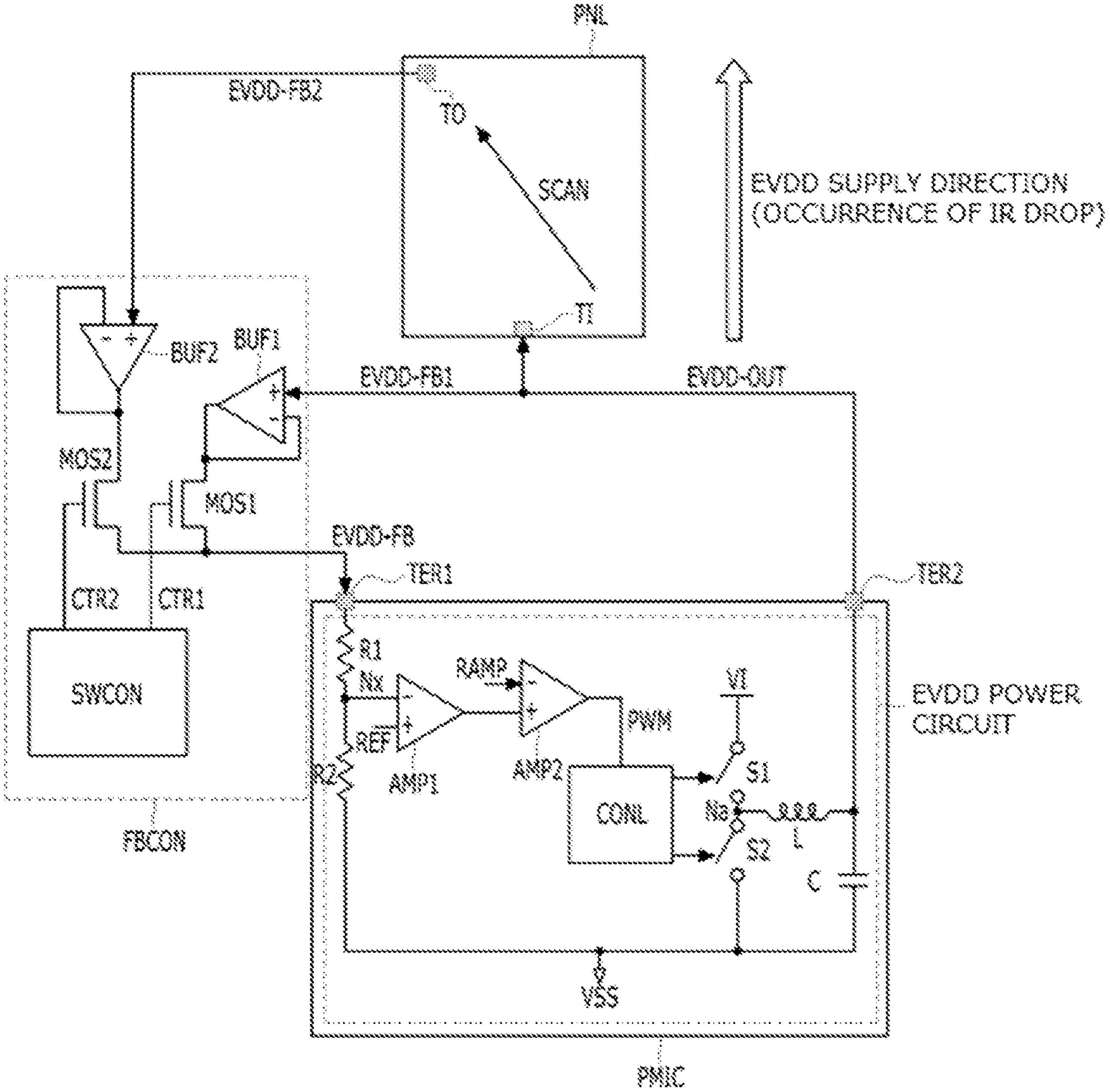
FIG. 3 is a diagram illustrating a compensation system according to a first embodiment of an electroluminescence display apparatus.
Figure 4:
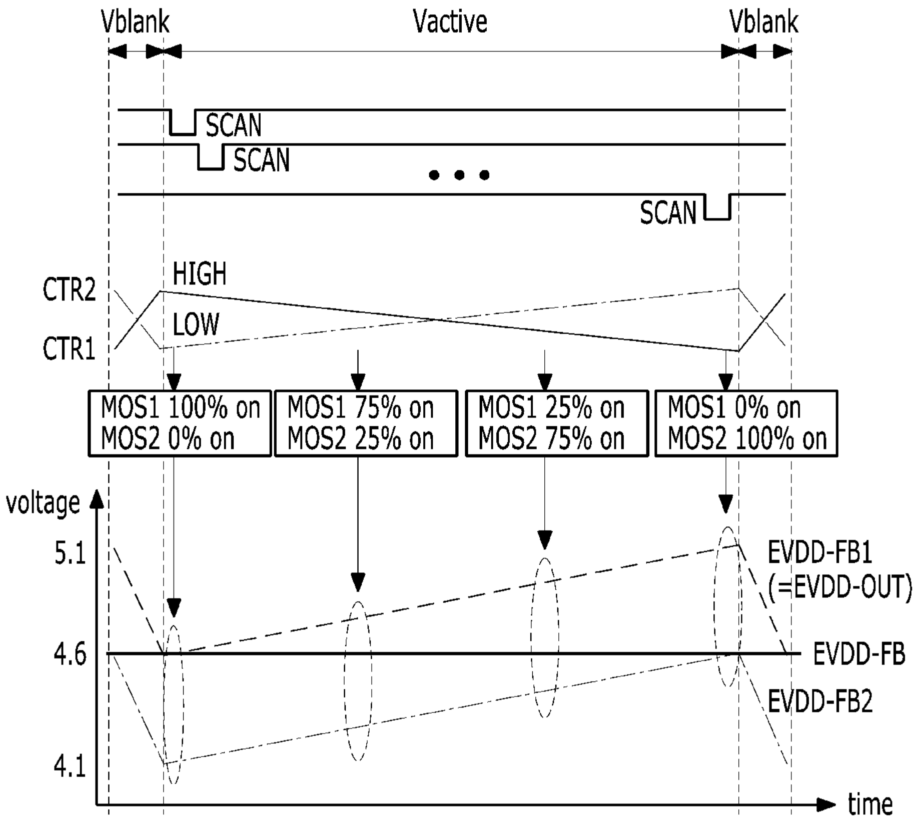
FIG. 4 is a diagram illustrating a driving timing of the compensation system according to the first embodiment.
Figure 5:
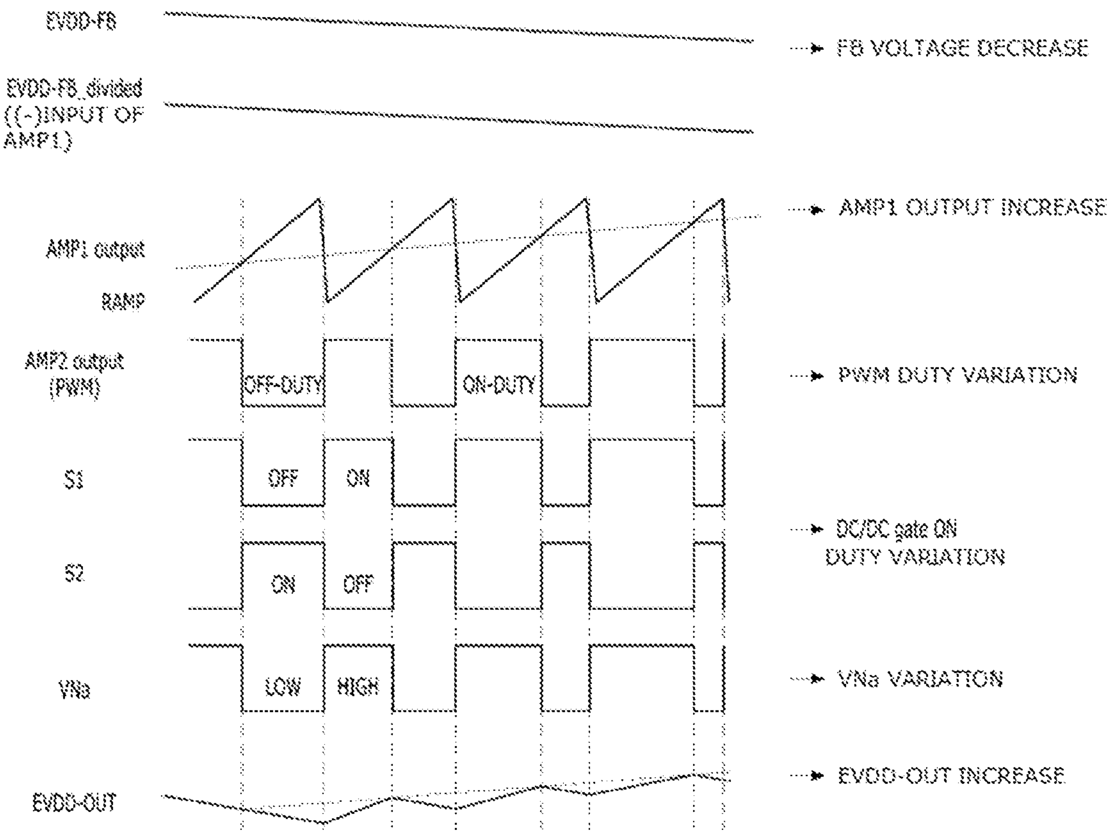
FIG. 5 is a diagram for describing a compensation operation of an EVDD power circuit in the compensation system according to the first embodiment.

FIG. 3 is a diagram illustrating a compensation system according to a first embodiment of an electroluminescence display apparatus. FIG. 4 is a diagram illustrating a driving timing of the compensation system according to the first embodiment. FIG. 5 is a diagram for describing a compensation operation of an EVDD power circuit in the compensation system according to the first embodiment.

Referring to FIGS. 3 and 4, the compensation system according to the first embodiment may include a display panel PNL, an EVDD power circuit, and a feedback control circuit FBCON.

A plurality of pixels connected to a first power line may be included in the display panel PNL, and each of the pixels may be supplied with a high level driving voltage EVDD-OUT through the first power line.

The EVDD power circuit may convert a final feedback driving voltage EVDD-FB input through a first input terminal TER1 to output the high level driving voltage EVDD-OUT to a first position TI of the first power line through a first output terminal TER2.

The EVDD power circuit may progressively increase an output of the high level driving voltage EVDD-OUT so that the final feedback driving voltage EVDD-FB has a certain target voltage, in a vertical active period Vactive where a data application scan signal SCAN is supplied. Therefore, in the vertical active period Vactive, a first feedback driving voltage EVDD-FB1 may be shifted in a direction increasing from the target voltage, and a second feedback driving voltage EVDD-FB2 may be shifted in a direction increasing toward the target voltage. In addition, "Vblank" in FIG. 4 represents a vertical blank period where the data application scan signal SCAN is not supplied.

The feedback control circuit FBCON may oppositely change a first output contribution rate of the first feedback driving voltage EVDD-FB1 and a second output contribution rate of the second feedback driving voltage EVDD-FB2 so that the final feedback driving voltage EVDD-FB has the certain target voltage. In other words, the feedback control circuit FBCON may change the first output contribution rate of the first feedback driving voltage EVDD-FB1 in a direction decreasing from 100% to 0% and may change the second output contribution rate of the second feedback driving voltage EVDD-FB2 in a direction increasing from 0% to 100%. The final feedback driving voltage EVDD-FB may maintain the target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

The feedback control circuit FBCON may receive the high level driving voltage EVDD-OUT as the first feedback driving voltage EVDD-FB1 and may receive the second feedback driving voltage EVDD-FB2 from a second position TO of a first power line, and then, may supply the first input terminal TER1 of the EVDD power circuit with the final feedback driving voltage EVDD-FB adjusted based on the first output contribution rate of the first feedback driving voltage EVDD-FB1 and the second output contribution rate of the second feedback driving voltage EVDD-FB2. Here, IR drop at the second position of the first power line may be greater than IR drop at the first position of the first power line. In other words, in magnitude of IR drop in the first power line, the IR drop may be the smallest at the first position and the IR drop may be the largest at the second position.

The feedback control circuit FBCON may include a control signal generating circuit SWCON which generates a first output control signal CTR1 for determining the first output contribution rate and a second output control signal CTR2 for determining the second output contribution rate, a first buffer BUF1 which receives the first feedback driving voltage EVDD-FB1, a second buffer BUF2 which receives the second feedback driving voltage EVDD-FB2, a first MOS transistor MOS1 which connects an output of the first buffer BUF1 to the first input terminal TER1 of the EVDD power circuit on the basis of an on rate thereof controlled according to the first output control signal CTR1, and a second MOS transistor MOS2 which connects an output of the second buffer BUF2 to the first input terminal TER1 of the EVDD power circuit on the basis of an on rate thereof controlled according to the second output control signal CTR2.

The first buffer BUF1 may prevent or at least reduce a reverse current occurring in the first MOS transistor MOS1 from being applied to the display panel PNL. Likewise, the second buffer BUF2 may prevent or at least reduce a reverse current occurring in the second MOS transistor MOS2 from being applied to the display panel PNL.

It is illustrated in FIG. 3 that each of the first MOS transistor MOS1 and the second MOS transistor MOS2 is implemented as an N-channel transistor, but the inventive concept is not limited thereto. In other embodiments, each of the first MOS transistor MOS1 and the second MOS transistor MOS2 may be implemented as a P-channel transistor.

In an initial period of the vertical active period Vactive, the first MOS transistor MOS1 may be turned on by 100% and the final feedback driving voltage EVDD-FB may be the first final feedback driving voltage EVDD-FB1 which is a target voltage (for example, 4.6 V), and in a last period of the vertical active period Vactive, the second MOS transistor MOS2 may be turned on by 100% and the final feedback driving voltage EVDD-FB may be the second final feedback driving voltage EVDD-FB2 which is a target voltage (for example, 4.6 V). Also, in a middle period of the vertical active period Vactive, the first MOS transistor MOS1 may be turned on by A % (where A is a natural number smaller than 100), the second MOS transistor MOS2 may be turned on by (100−A) %, and the final feedback driving voltage EVDD-FB may be a target voltage (for example, 4.6 V) between the first final feedback driving voltage EVDD-FB1 and the second final feedback driving voltage EVDD-FB2.

FIG. 4 shows a waveform after a feedback compensation operation in the EVDD power circuit is completed, and thus, the final feedback driving voltage EVDD-FB is expressed in a certain target voltage form and the high level driving voltage EVDD-OUT is expressed to progressively increase so that a reduction in a voltage caused by IR drop is compensated for according to one embodiment. Also, based on an increase in the high level driving voltage EVDD-OUT, the first feedback driving voltage EVDD-FB1 and the second feedback driving voltage EVDD-FB2 are expressed to progressively increase.

In order to progressively increase the high level driving voltage EVDD-OUT, the EVDD power circuit may include a first voltage division resistor string R1 and R2 connected to the first input terminal TER1 and a first converting circuit which DC-DC converts the final feedback driving voltage EVDD-FB divided by the first voltage division resistor string R1 and R2 to output the high level driving voltage EVDD-OUT capable of compensating for an image quality deviation caused by IR drop. The EVDD power circuit may be implemented with a first DC-DC converter including a first converting circuit.

It is illustrated that the first DC-DC converter is a buck converter, but the inventive concept is not limited thereto and the first DC-DC converter may be replaced with another type of converter such as a boost converter.

The first DC-DC converter may include a first amplifier AMP1 which compares a reference voltage REF with the final feedback driving voltage EVDD-FB divided by a first voltage division node Nx of the first voltage division resistor string R1 and R2, a second amplifier AMP2 which compares an output of the first amplifier AMP1 with a ramp waveform RAMP to generate a PWM output waveform, a first controller CONL which outputs a first switch control signal and a second switch control signal having opposite phases on the basis of the PWM output waveform, a first output switch S1 which is connected between a high level source voltage VI and a first output node Na, a second output switch S2 which is connected between the first output node Na and a low level source voltage VSS, a first inductor L which is connected between the first output node Na and a first output terminal TER2, and a first capacitor C which is connected between the first output terminal TER2 and the low level source voltage VSS.

As in FIG. 5, in an initial operation immediately after a driving power is applied, a before-compensation final feedback driving voltage EVDD-FB and a divided final feedback driving voltage EVDD-FB input to the EVDD power circuit may progressively decrease over time due to an influence of IR drop. The divided final feedback driving voltage EVDD-FB may be an input (−) of the first amplifier AMP1. The first amplifier AMP1 may differentially amplify the divided final feedback driving voltage EVDD-FB and the reference voltage REF, and thus, an output of the first amplifier AMP1 may increase over time. The second amplifier AMP2 may generate a PWM output waveform which rises or falls at an intersection point between the output of the first amplifier AMP1 and the ramp waveform RAMP. An on duty and an off duty of the PWM output waveform may be alternated and the on duty thereof may increase over time, an on timing of the first output switch S1 may be synchronize with the on duty of the PWM output waveform, and an on timing of the second output switch S2 may be synchronize with the off duty of the PWM output waveform. A voltage of the first output node Na may have a high level VI in an on duty period of the PWM output waveform and may have a low level VSS in an off duty period of the PWM output waveform. Also, the high level driving voltage EVDD-OUT output from the EVDD power circuit may increase when a voltage VNa of the first output node Na has the high level VI and may decrease when the voltage VNa of the first output node Na has the low level VSS. A voltage increase period may extend more than a voltage decrease period over time, and thus, the high level driving voltage EVDD-OUT may increase until the final feedback driving voltage EVDD-FB is a target voltage.

The high level driving voltage EVDD-OUT may be applied to all horizontal pixel lines at a certain level by using a compensation mechanism during the vertical active period Vactive, thereby preventing or at least reducing image quality from being degraded by IR drop.

Second Embodiment

Figure 6:
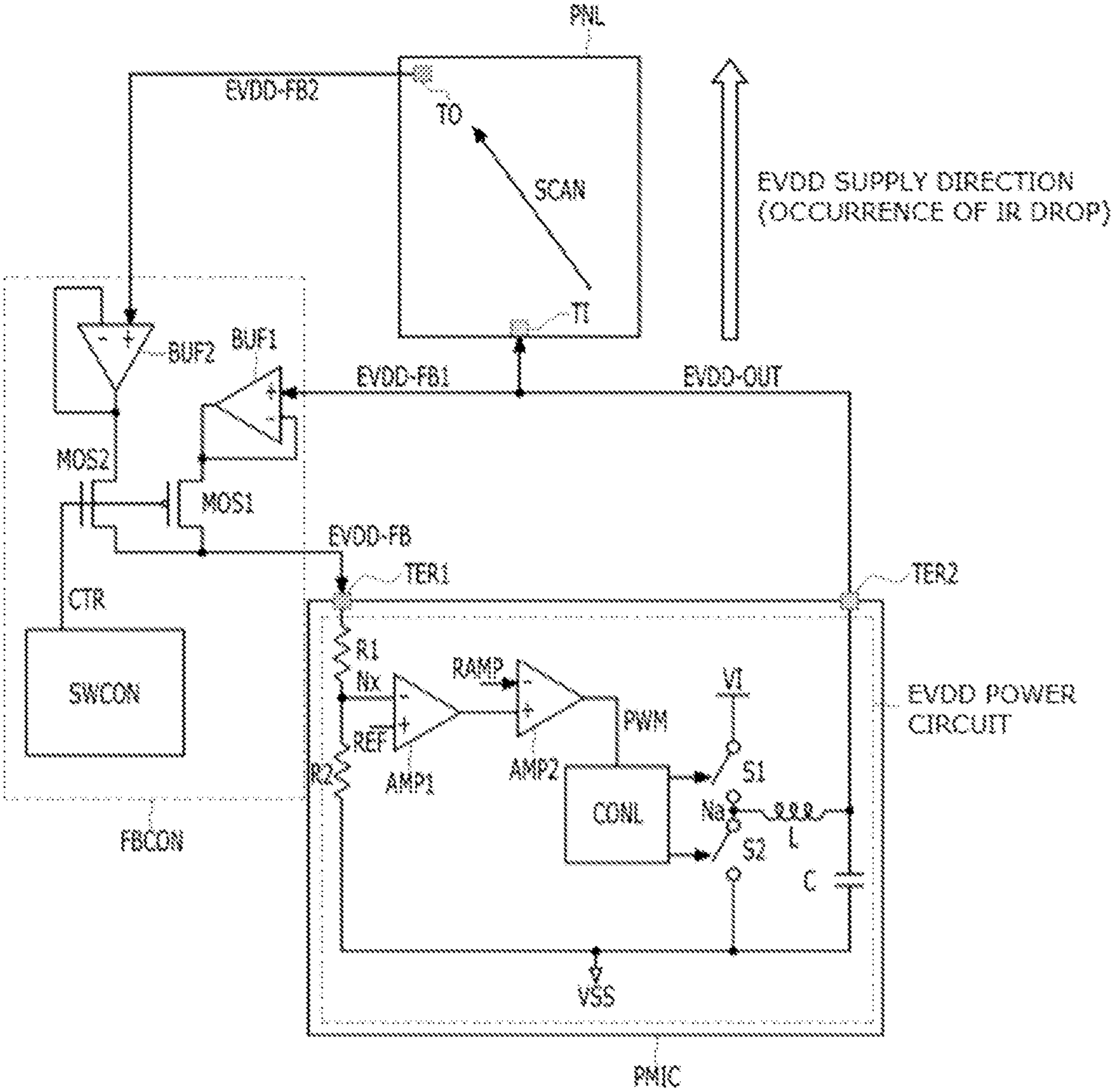
FIG. 6 is a diagram illustrating a compensation system according to a second embodiment of an electroluminescence display apparatus.
Figure 7:
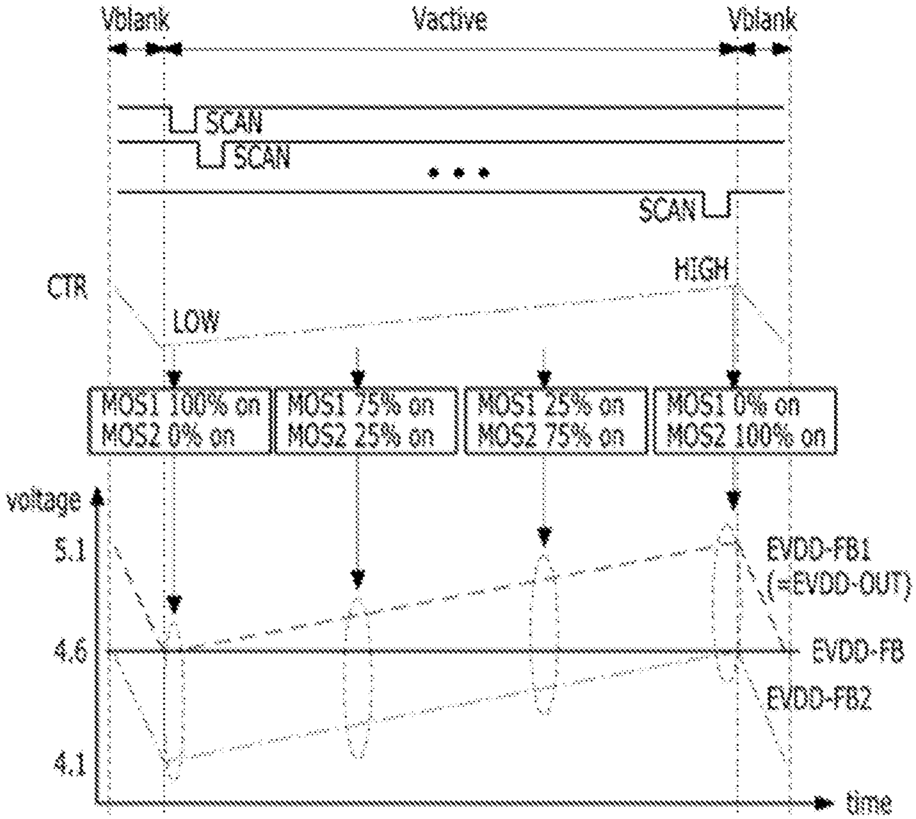
FIG. 7 is a diagram illustrating a driving timing of the compensation system according to the second embodiment.

FIG. 6 is a diagram illustrating a compensation system according to a second embodiment of an electroluminescence display apparatus. FIG. 7 is a diagram illustrating a driving timing of the compensation system according to the second embodiment.

Referring to FIG. 6, the compensation system according to the second embodiment may include a display panel PNL, an EVDD power circuit, and a feedback control circuit FBCON.

The display panel PNL and the EVDD power circuit of FIG. 6 may be substantially the same as descriptions given above with reference to FIG. 3. However, in terms of a configuration of the feedback control circuit FBCON, FIG. 6 may have a difference with FIG. 3. That is, MOS transistors MOS1 and MOS2 included in the feedback control circuit FBCON of FIG. 6 may be implemented as different channel types, and thus, the MOS transistors MOS1 and MOS2 may be controlled according to one output control signal CTR and a control signal generating circuit SWCON generating the output control signal CTR may be simplified.

In detail, the feedback control circuit FBCON may receive a high level driving voltage EVDD-OUT as a first feedback driving voltage EVDD-FB1 and may receive a second feedback driving voltage EVDD-FB2 from a second position TO of a first power line, and then, may supply a first input terminal TER1 of the EVDD power circuit with a final feedback driving voltage EVDD-FB adjusted based on a first output contribution rate of the first feedback driving voltage EVDD-FB1 and a second output contribution rate of the second feedback driving voltage EVDD-FB2. Here, IR drop at the second position of the first power line may be greater than IR drop at the first position of the first power line. In other words, in magnitude of IR drop in the first power line, the IR drop may be the smallest at the first position and the IR drop may be the largest at the second position.

In a vertical active period Vactive where a data application scan signal SCAN is supplied, as in FIG. 7, the final feedback driving voltage EVDD-FB may maintain a target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

Referring to FIG. 7, in the vertical active period Vactive, the feedback control circuit FBCON may change the first feedback driving voltage EVDD-FB1 in a direction increasing from a target level and may change the second feedback driving voltage EVDD-FB2 in a direction increasing toward the target level, so that the final feedback driving voltage EVDD-FB has a certain target voltage. At this time, the feedback control circuit FBCON may oppositely change the first output contribution rate of the first feedback driving voltage EVDD-FB1 and the second output contribution rate of the second feedback driving voltage EVDD-FB2. In other words, the feedback control circuit FBCON may change the first output contribution rate of the first feedback driving voltage EVDD-FB1 in a direction decreasing from 100% to 0% and may change the second output contribution rate of the second feedback driving voltage EVDD-FB2 in a direction increasing from 0% to 100%.

To this end, as in FIG. 6, the feedback control circuit FBCON may include a control signal generating circuit SWCON which generates an output control signal CTR for differently determining the first output contribution rate and the second output contribution rate, a first buffer BUF1 which receives the first feedback driving voltage EVDD-FB1, a second buffer BUF2 which receives the second feedback driving voltage EVDD-FB2, a first MOS transistor MOS1 which connects an output of the first buffer BUF1 to the first input terminal TER1 of the EVDD power circuit on the basis of an on rate thereof controlled according to the output control signal CTR, and a second MOS transistor MOS2 which connects an output of the second buffer BUF2 to the first input terminal TER1 of the EVDD power circuit on the basis of an on rate thereof controlled according to the output control signal CTR.

The first buffer BUF1 may prevent or at least reduce a reverse current occurring in the first MOS transistor MOS1 from being applied to the display panel PNL. Likewise, the second buffer BUF2 may prevent or at least reduce a reverse current occurring in the second MOS transistor MOS2 from being applied to the display panel PNL.

It is illustrated in FIG. 6 that the first MOS transistor MOS1 is implemented as a P-channel transistor and the second MOS transistor MOS2 is implemented as an N-channel transistor, but the inventive concept is not limited thereto. In other embodiments, the first MOS transistor MOS1 may be implemented as an N-channel transistor, and the second MOS transistor MOS2 may be implemented as a P-channel transistor.

Third Embodiment

Figure 8:
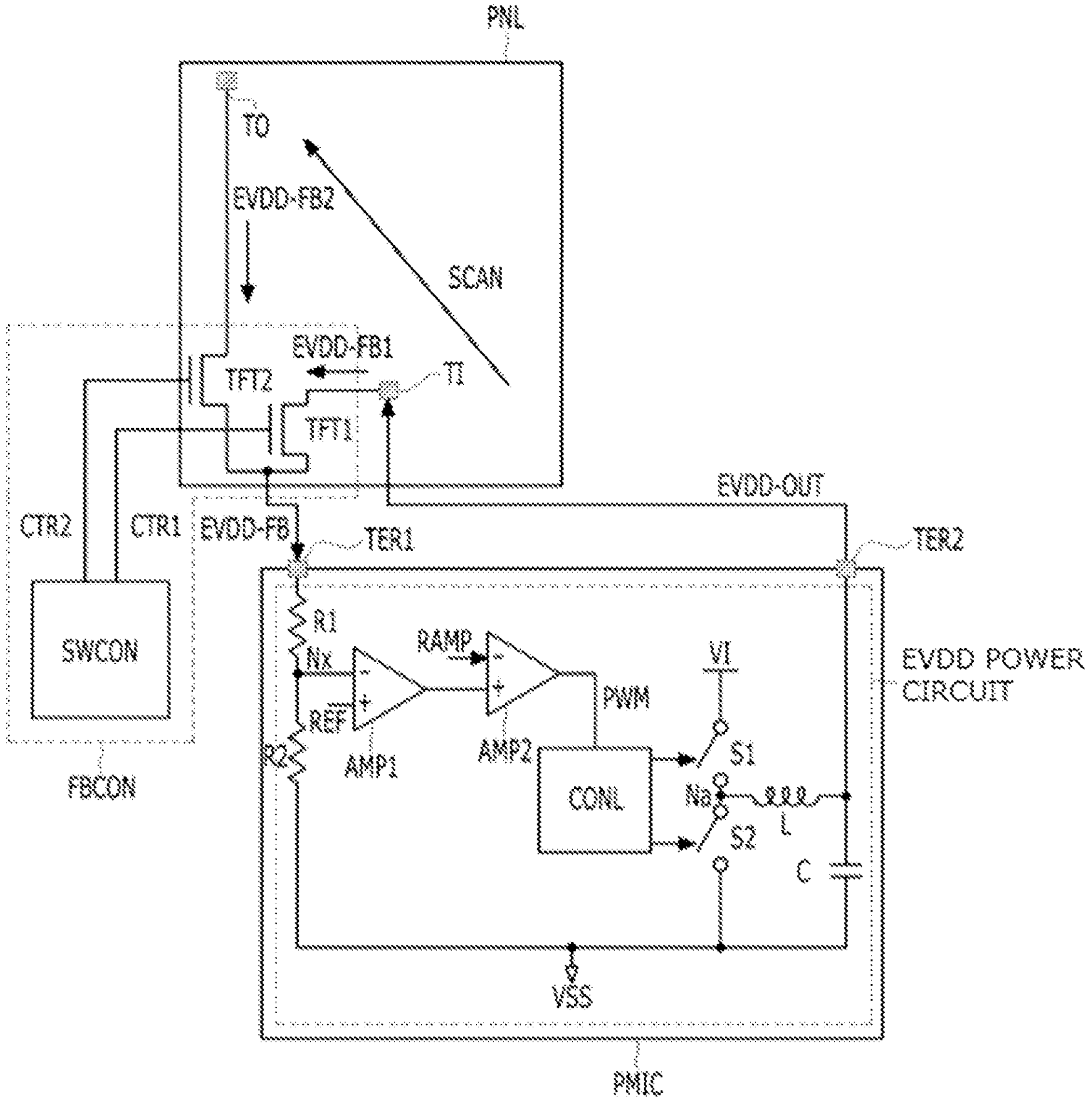
FIG. 8 is a diagram illustrating a compensation system according to a third embodiment of an electroluminescence display apparatus.

FIG. 8 is a diagram illustrating a compensation system according to a third embodiment of an electroluminescence display apparatus.

Referring to FIG. 8, the compensation system according to the third embodiment may include a display panel PNL, an EVDD power circuit, and a feedback control circuit FBCON.

The display panel PNL and the EVDD power circuit of FIG. 8 may be substantially the same as descriptions given above with reference to FIG. 3. However, in terms of a configuration of the feedback control circuit FBCON, FIG. 8 may have a difference with FIG. 3. That is, FIG. 8 may have a difference with FIG. 3 in that the feedback control circuit FBCON of FIG. 8 is implemented with thin film transistors TFT1 and TFT2, the thin film transistors TFT1 and TFT2 are provided in the display panel PNL, and separate buffers are not needed. The feedback control circuit FBCON of FIG. 8 may have an advantage where an area mounted on a control board is reduced compared to FIG. 3.

In detail, the feedback control circuit FBCON may receive a high level driving voltage EVDD-OUT as a first feedback driving voltage EVDD-FB1 and may receive a second feedback driving voltage EVDD-FB2 from a second position TO of a first power line, and then, may supply a first input terminal TER1 of the EVDD power circuit with a final feedback driving voltage EVDD-FB adjusted based on a first output contribution rate of the first feedback driving voltage EVDD-FB1 and a second output contribution rate of the second feedback driving voltage EVDD-FB2. Here, IR drop at the second position of the first power line may be greater than IR drop at the first position of the first power line. In other words, in magnitude of IR drop in the first power line, the IR drop may be the smallest at the first position and the IR drop may be the largest at the second position.

In a vertical active period Vactive where a data application scan signal SCAN is supplied, as in FIG. 4, the final feedback driving voltage EVDD-FB may maintain a target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

In the vertical active period Vactive, the feedback control circuit FBCON may change the first feedback driving voltage EVDD-FB1 in a direction increasing from a target level and may change the second feedback driving voltage EVDD-FB2 in a direction increasing toward the target level. At this time, the feedback control circuit FBCON may oppositely change the first output contribution rate of the first feedback driving voltage EVDD-FB1 and the second output contribution rate of the second feedback driving voltage EVDD-FB2. In other words, the feedback control circuit FBCON may change the first output contribution rate of the first feedback driving voltage EVDD-FB1 in a direction decreasing from 100% to 0% and may change the second output contribution rate of the second feedback driving voltage EVDD-FB2 in a direction increasing from 0% to 100%.

To this end, as in FIG. 8, the feedback control circuit FBCON may include a control signal generating circuit SWCON which generates a first output control signal CTR1 for determining the first output contribution rate and a second output control signal CTR2 for determining the second output contribution rate, a first thin film transistor TFT1 which connects the first feedback driving voltage EVDD-FB1 to the first input terminal TER1 of the EVDD power circuit on the basis of an on rate thereof controlled according to the first output control signal CTR1, and a second thin film transistor TFT2 which connects the second feedback driving voltage EVDD-FB2 to the first input terminal TER1 of the EVDD power circuit on the basis of an on rate thereof controlled according to the second output control signal CTR2.

It is illustrated in FIG. 8 that each of the first thin film transistor TFT1 and the second thin film transistor TFT2 is implemented as an N-channel transistor, but the inventive concept is not limited thereto. In other embodiments, each of the first thin film transistor TFT1 and the second thin film transistor TFT2 may be implemented as a p-channel transistor.

Fourth Embodiment

Figure 9:
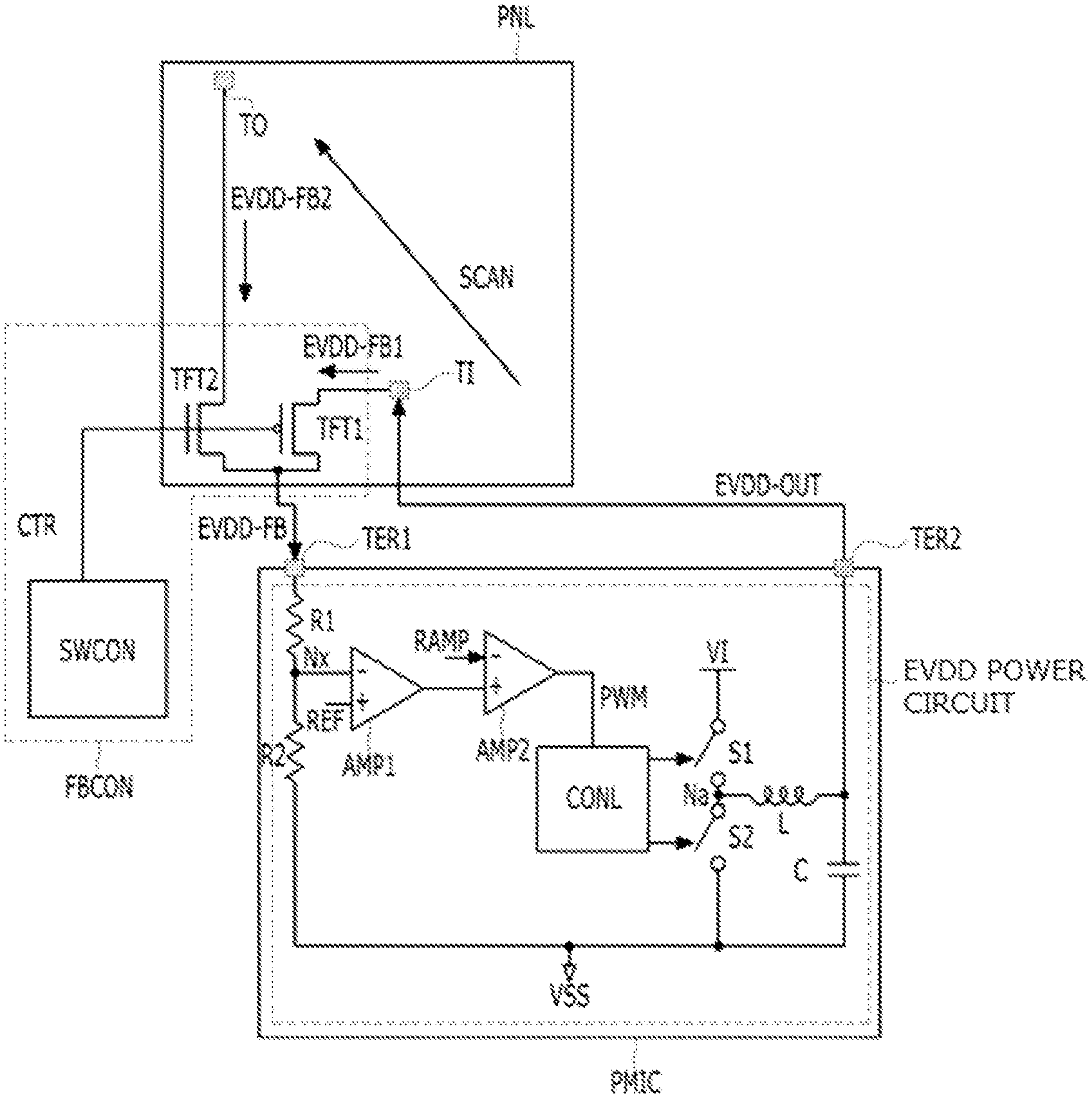
FIG. 9 is a diagram illustrating a compensation system according to a fourth embodiment of an electroluminescence display apparatus.

FIG. 9 is a diagram illustrating a compensation system according to a fourth embodiment of an electroluminescence display apparatus.

Referring to FIG. 9, the compensation system according to the fourth embodiment may include a display panel PNL, an EVDD power circuit, and a feedback control circuit FBCON.

The display panel PNL and the EVDD power circuit of FIG. 9 may be substantially the same as descriptions given above with reference to FIG. 6. However, in terms of a configuration of the feedback control circuit FBCON, FIG. 9 may have a difference with FIG. 6. That is, FIG. 9 may have a difference with FIG. 6 in that the feedback control circuit FBCON of FIG. 9 is implemented with thin film transistors TFT1 and TFT2, the thin film transistors TFT1 and TFT2 are provided in the display panel PNL, and separate buffers are not needed. The feedback control circuit FBCON of FIG. 9 may have an advantage where an area mounted on a control board is reduced compared to FIG. 6.

In detail, the feedback control circuit FBCON may receive a high level driving voltage EVDD-OUT as a first feedback driving voltage EVDD-FB1 and may receive a second feedback driving voltage EVDD-FB2 from a second position TO of a first power line, and then, may supply a first input terminal TER1 of the EVDD power circuit with a final feedback driving voltage EVDD-FB adjusted based on a first output contribution rate of the first feedback driving voltage EVDD-FB1 and a second output contribution rate of the second feedback driving voltage EVDD-FB2. Here, IR drop at the second position of the first power line may be greater than IR drop at the first position of the first power line. In other words, in magnitude of IR drop in the first power line, the IR drop may be the smallest at the first position and the IR drop may be the largest at the second position.

In a vertical active period Vactive where a data application scan signal SCAN is supplied, as in FIG. 7, the final feedback driving voltage EVDD-FB may maintain a target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

In the vertical active period Vactive, the feedback control circuit FBCON may change the first feedback driving voltage EVDD-FB1 in a direction increasing from a target level and may change the second feedback driving voltage EVDD-FB2 in a direction increasing toward the target level. At this time, the feedback control circuit FBCON may oppositely change the first output contribution rate of the first feedback driving voltage EVDD-FB1 and the second output contribution rate of the second feedback driving voltage EVDD-FB2. In other words, the feedback control circuit FBCON may change the first output contribution rate of the first feedback driving voltage EVDD-FB1 in a direction decreasing from 100% to 0% and may change the second output contribution rate of the second feedback driving voltage EVDD-FB2 in a direction increasing from 0% to 100%.

To this end, as in FIG. 9, the feedback control circuit FBCON may include a control signal generating circuit SWCON which generates an output control signal CTR for differently determining the first output contribution rate and the second output contribution rate, a first thin film transistor TFT1 which connects the first feedback driving voltage EVDD-FB1 to the first input terminal TER1 of the EVDD power circuit on the basis of an on rate thereof controlled according to the output control signal CTR, and a second thin film transistor TFT2 which connects the second feedback driving voltage EVDD-FB2 to the first input terminal TER1 of the EVDD power circuit on the basis of an on rate thereof controlled according to the output control signal CTR.

It is illustrated in FIG. 9 that the first thin film transistor TFT1 is implemented as a P-channel transistor and the second thin film transistor TFT2 is implemented as an N-channel transistor, but the inventive concept is not limited thereto. In other embodiments, the first thin film transistor TFT1 is implemented as an N-channel transistor, and the second thin film transistor TFT2 is implemented as a P-channel transistor.

Fifth to Eighth Embodiments

Figure 10:
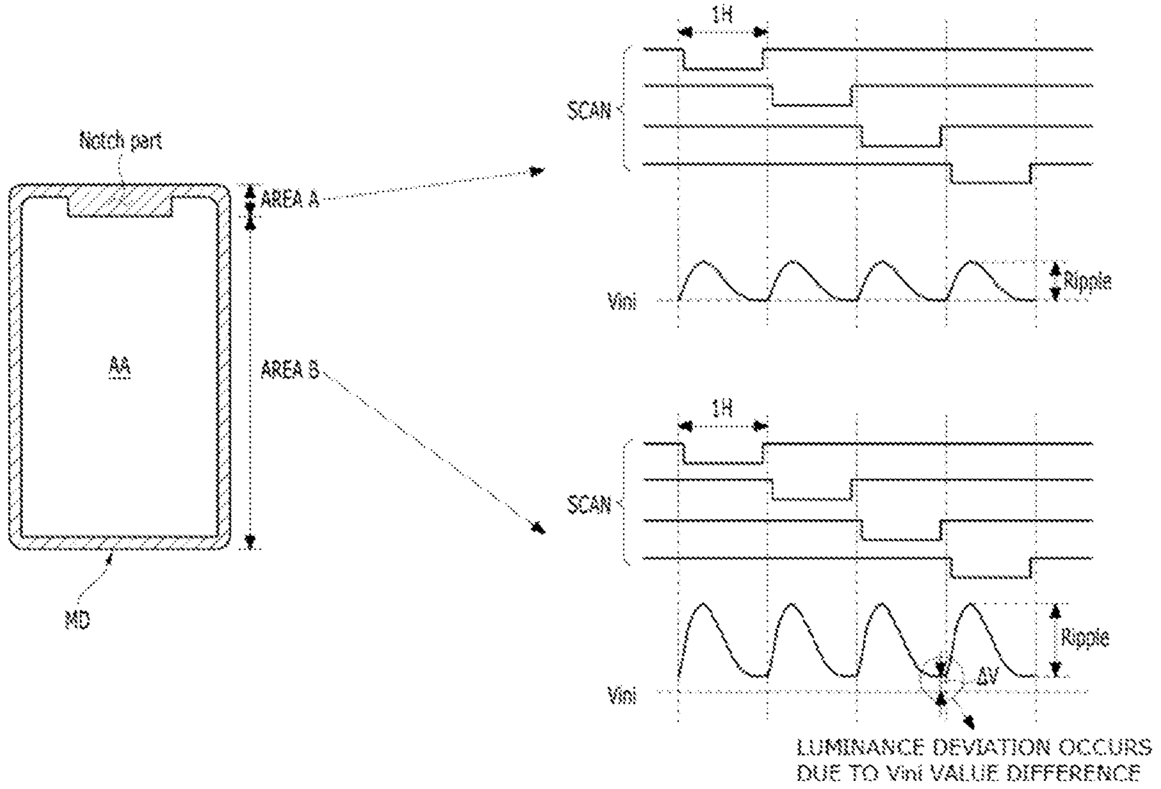
FIG. 10 is a diagram showing a luminance deviation caused by a ripple deviation of an initialization voltage occurring between a region including a notch and a region including no notch.

FIG. 10 is a diagram showing a luminance deviation caused by a ripple deviation of an initialization voltage Vini value occurring between a region including a notch and a region including no notch.

Referring to FIG. 10, a display module MD may include a first area A including a notch part and a second area B that lacks a notch part (e.g., does not have a notch part). A pixel may be provided in only an active area AA of each of the first area A and the second area B and may not be provided in the notch part. The notch part may not implement an image. A camera module may be disposed in the notch part, and a chip type driver IC may be disposed in the notch part.

The first area A may include fewer pixels included in one horizontal pixel line than the second area B. Due to such a pixel number difference, a total current corresponding to one horizontal pixel line of the first area A may be less than a total current corresponding to one horizontal pixel line of the second area B. Therefore, a ripple magnitude of an initialization voltage Vini supplied to one horizontal pixel line of the first area A may be less than a ripple magnitude of the initialization voltage Vini supplied to one horizontal pixel line of the second area B. Also, due to such a ripple deviation, the initialization voltage Vini in the second area B may be "ΔV" higher than the initialization voltage Vini in the first area A, causing a luminance deviation between the first area A and the second area B.

In order to compensate for an image quality deviation caused by the IR drop of a high level driving voltage and to further compensate for a luminance deviation caused by a ripple deviation of the above-described initialization voltage, the electroluminescence display apparatus according to the present disclosure may use a compensation system according to fifth to eighth embodiments.

Figure 11:
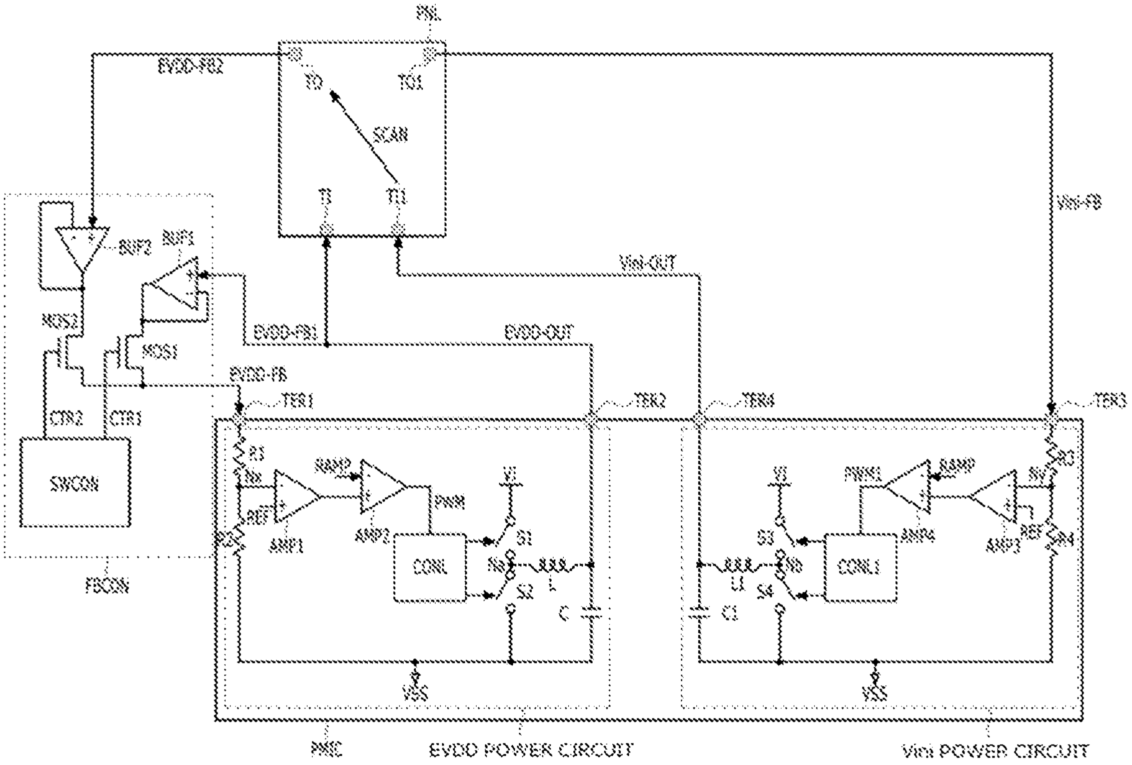
FIGS. 11 to 14 are diagrams illustrating a compensation system according to fifth to eighth embodiments.
Figure 12:
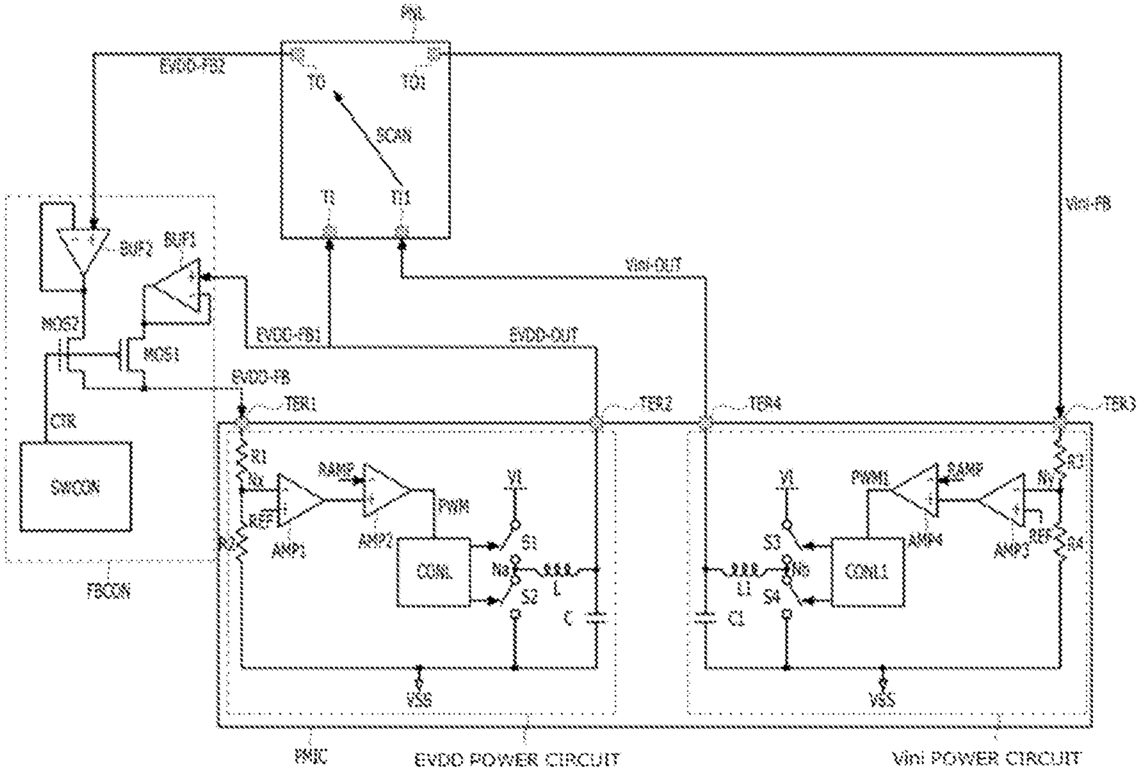
Figure 13:
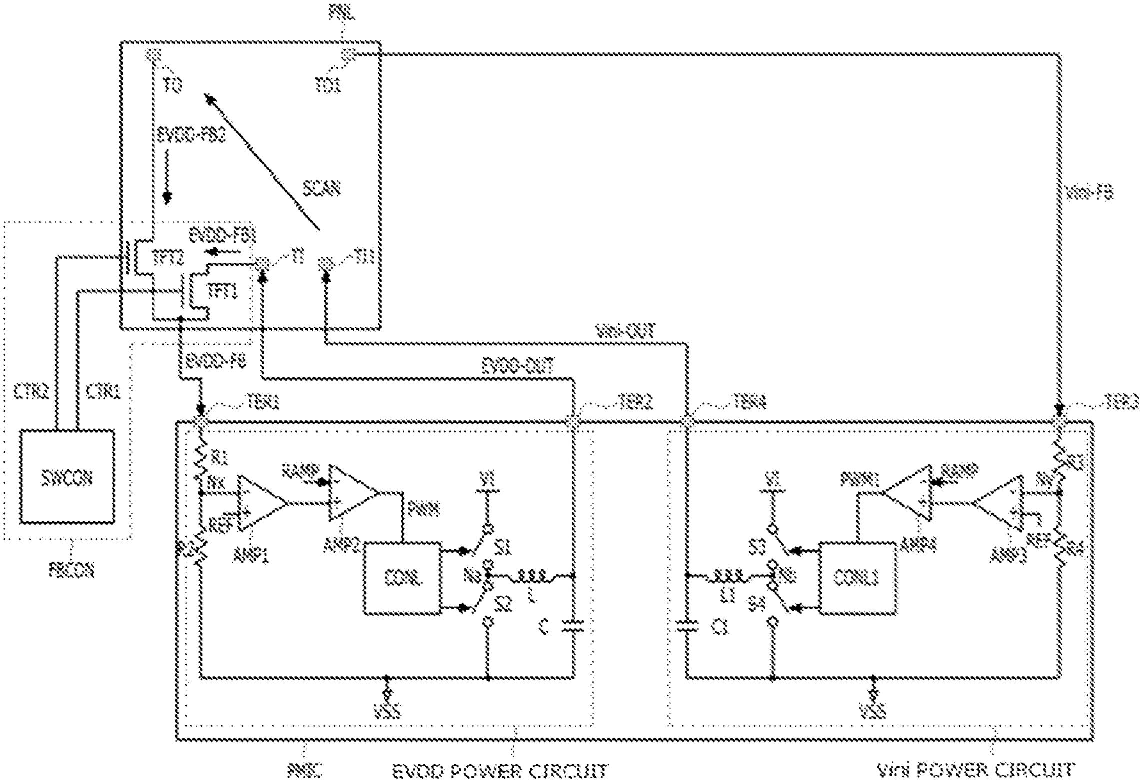
Figure 14:
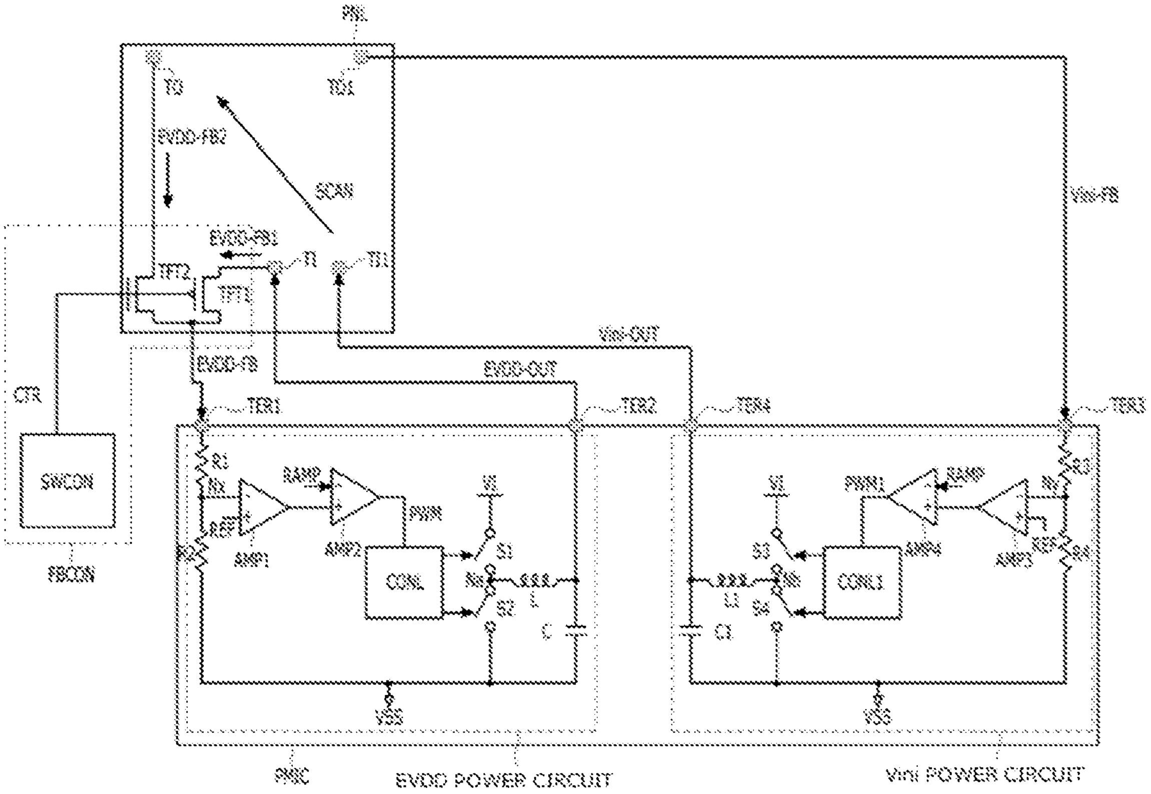

The compensation system according to the fifth embodiment illustrated in FIG. 11 may be implemented by adding a Vini power circuit to the compensation system according to the first embodiment described above, the compensation system according to the sixth embodiment illustrated in FIG. 12 may be implemented by adding a Vini power circuit to the compensation system according to the second embodiment described above, the compensation system according to the seventh embodiment illustrated in FIG. 13 may be implemented by adding a Vini power circuit to the compensation system according to the third embodiment described above, and the compensation system according to the eighth embodiment illustrated in FIG. 14 may be implemented by adding a Vini power circuit to the compensation system according to the fourth embodiment described above.

In FIGS. 11 to 14, a plurality of pixels disposed in a display panel PNL may be further connected to a second power line so as to receive an initialization voltage Vini-OUT.

A Vini power circuit may include a second input terminal TER3 and a second output terminal TER4. The Vini power circuit may receive a feedback initialization voltage Vini-FB from a third position TO1 of a second power line through the second input terminal TER3 and may convert the feedback initialization voltage Vini-FB to output the initialization voltage Vini-OUT to a fourth position TI1 of the second power line through the second output terminal TER4.

Here, the third position TO1 may correspond to the first area A of FIG. 10 including a notch, and the fourth position TI1 may correspond to the second area B of FIG. 10 including no notch. Therefore, the number of horizontal-line pixels of the display panel PNL corresponding to the third position TO1 may be less than the number of horizontal-line pixels of the display panel PNL corresponding to the fourth position TI1.

The Vini power circuit may control the initialization voltage Vini-OUT which is to be supplied to the fourth position TH, with respect to the feedback initialization voltage Vini-FB corresponding to the third position TO1.

The Vini power circuit may include a second voltage division resistor string R3 and R4 connected to the second input terminal TER3 and a second converting circuit which DC-DC converts the feedback initialization voltage Vini-FB divided by the second voltage division resistor string R3 and R4 to output the initialization voltage Vini-OUT capable of compensating for a luminance deviation caused by a ripple deviation.

It is illustrated that the second DC-DC converter is a buck converter, but the inventive concept is not limited thereto and the second DC-DC converter may be replaced with another type of converter such as a boost converter.

The second DC-DC converter may include a third amplifier AMP3 which compares a reference voltage REF with the feedback initialization voltage Vini-FB divided by a second voltage division node Ny of the second voltage division resistor string R3 and R4, a fourth amplifier AMP4 which compares an output of the third amplifier AMP3 with a ramp waveform RAMP to generate a PWM1 output waveform, a second controller CONL1 which outputs a third switch control signal and a fourth switch control signal having opposite phases on the basis of the PWM1 output waveform, a third output switch S3 which is connected between a high level source voltage VI and a second output node Nb, a fourth output switch S4 which is connected between the second output node Nb and a low level source voltage VSS, a second inductor L1 which is connected between the second output node Nb and the second output terminal TER4, and a second capacitor C1 which is connected between the second output terminal TER4 and the low level source voltage VSS.

The Vini power circuit may receive the feedback initialization voltage Vini-FB through the second input terminal TER3 to output the initialization voltage Vini-OUT through the second output terminal TER4. When the feedback initialization voltage Vini-FB is lower than a target initialization voltage, the Vini power circuit may increase the initialization voltage Vini-OUT, and when the feedback initialization voltage Vini-FB is higher than the target initialization voltage, the Vini power circuit may decrease the initialization voltage Vini-OUT. Based on such a voltage feedback operation, the feedback initialization voltage Vini-FB may maintain a predetermined or certain target initialization voltage in the vertical active period, thereby reducing a luminance deviation caused by a ripple deviation between a notch region and a non-notch region.

For example, when a relatively large ripple occurs in an initialization voltage at the third position TO1, the feedback initialization voltage Vini-FB may increase over time, and thus, a negative (−) input voltage of the third amplifier AMP3 may increase. On the other hand, an output of the third amplifier AMP3 and a positive (+) input of the fourth amplifier AMP4 may be lowered. Therefore, an on duty period of a PMW1 signal may be shortened over time, and an operation duty of the second DC-DC converter may be reduced by the third output switch S3 and the fourth output switch S4, whereby the initialization voltage Vini-OUT may be lowered. As described above, the initialization voltage Vini-OUT may be adjusted so that the feedback initialization voltage is a target initialization voltage.

Ninth Embodiment

Figure 15:
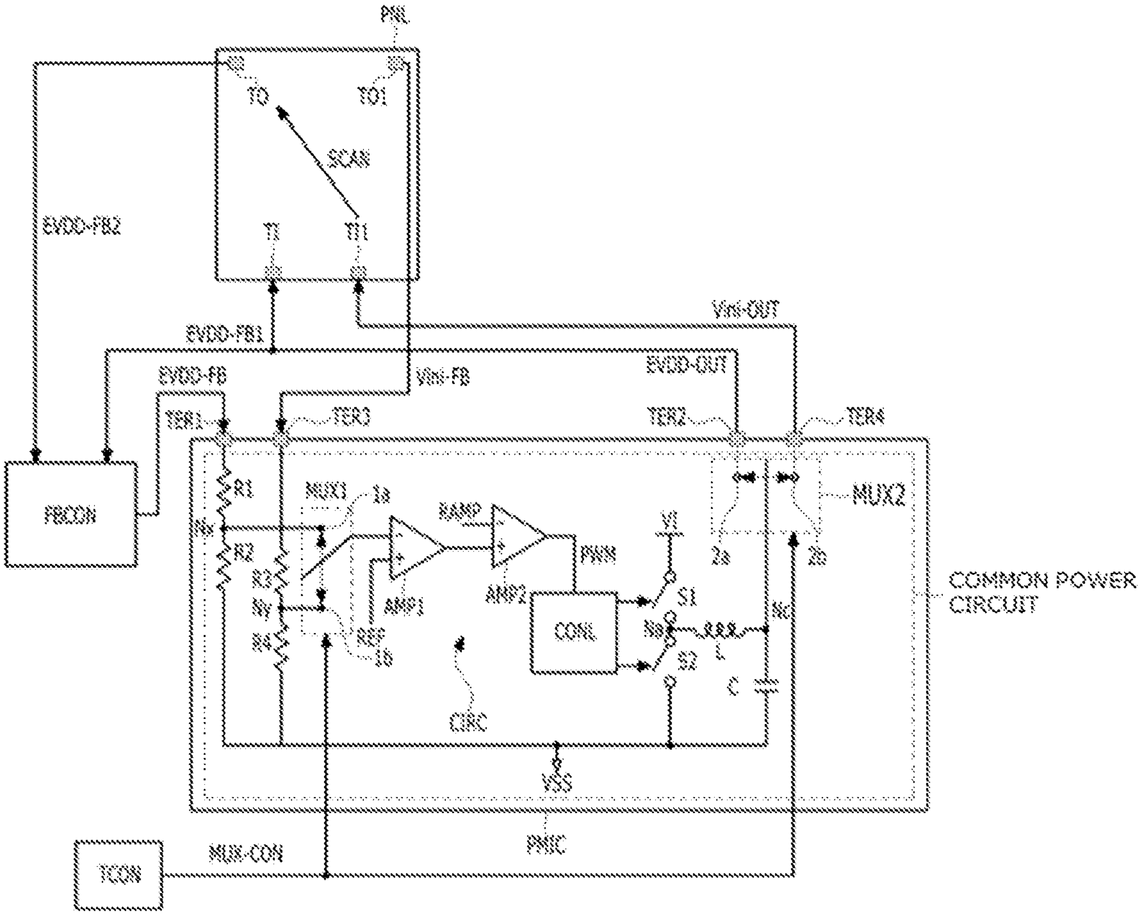
FIG. 15 is a diagram illustrating a compensation system according to a ninth embodiment of an electroluminescence display apparatus.
Figure 16:
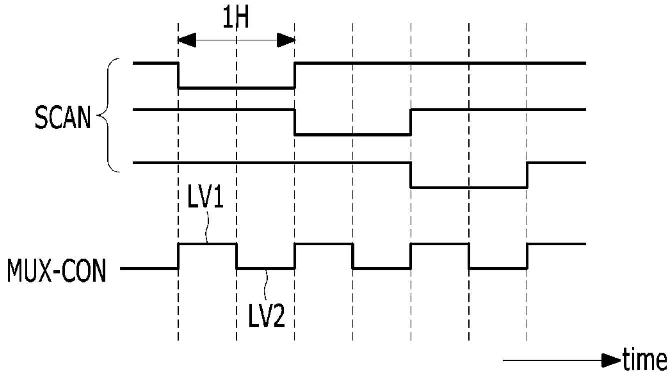
FIG. 16 is a diagram showing a timing of a data application scan signal and a MUX control signal applied to the compensation system according to the ninth embodiment.

FIG. 15 is a diagram illustrating a compensation system according to a ninth embodiment of an electroluminescence display apparatus. FIG. 16 is a diagram showing a timing of a data application scan signal and a MUX control signal applied to the compensation system according to the ninth embodiment.

Referring to FIGS. 15 and 16, the compensation system according to the ninth embodiment may be the same as the above-described fifth to eighth embodiments in that the compensation system according to the ninth embodiment compensates for an image quality deviation caused by the IR drop of a high level driving voltage and further compensates for a luminance deviation caused by a ripple deviation of an initialization voltage. However, the compensation system according to the ninth embodiment may have a difference with the above-described fifth to eighth embodiments in that an EVDD power circuit and a Vini power circuit are integrated as one body. The compensation system according to the ninth embodiment may more reduce a circuit mount area of a power generating circuit PMIC than the above-described fifth to eighth embodiments.

The compensation system according to the ninth embodiment may include a display panel PNL, a common power circuit, and a feedback control circuit FBCON.

A plurality of pixels connected to a first power line and a second power line may be included in the display panel PNL, and each of the pixels may be supplied with a high level driving voltage EVDD-OUT through the first power line and may be supplied with the initialization voltage Vini-OUT through the second power line.

The common power circuit may convert a final feedback driving voltage EVDD-FB input through a first input terminal TER1 thereof to output the high level driving voltage EVDD-OUT to a first position TI of the first power line through a first output terminal TER2 thereof. Also, the common power circuit may receive a feedback initialization voltage Vini-FB from a third position TO1 of the second power line through a second input terminal TER3 thereof and may convert the feedback initialization voltage Vini-FB to output the initialization voltage Vini-OUT to a fourth position TI1 of the second power line through a second output terminal TER4 thereof.

The feedback control circuit FBCON may receive a high level driving voltage EVDD-OUT as a first feedback driving voltage EVDD-FB1 and may receive a second feedback driving voltage EVDD-FB2 from a second position TO of the first power line, and then, may supply the first input terminal TER1 of the common power circuit with a final feedback driving voltage EVDD-FB adjusted based on a first output contribution rate of the first feedback driving voltage EVDD-FB1 and a second output contribution rate of the second feedback driving voltage EVDD-FB2. Here, IR drop at the second position of the first power line may be greater than IR drop at the first position of the first power line. In other words, in magnitude of IR drop in the first power line, the IR drop may be the smallest at the first position and the IR drop may be the largest at the second position.

In a vertical active period Vactive where a data application scan signal SCAN is supplied, as in FIG. 7, the final feedback driving voltage EVDD-FB may maintain a target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

As described above, in the vertical active period Vactive where the data application scan signal SCAN is supplied, the final feedback driving voltage EVDD-FB may maintain the target voltage on the basis of the first output contribution rate of the first feedback driving voltage EVDD-FB1 and the second output contribution rate of the second feedback driving voltage EVDD-FB2, and thus, an image quality deviation caused by IR drop may be effectively reduced.

Moreover, the third position TO1 may correspond to the first area A of FIG. 10 including a notch, and the fourth position TH may correspond to the second area B of FIG. 10 including no notch. Therefore, the number of horizontal-line pixels of the display panel PNL corresponding to the third position TO1 may be less than the number of horizontal-line pixels of the display panel PNL corresponding to the fourth position TH, and the initialization voltage Vini-OUT which is to be supplied to the fourth position TH may be controlled with respect to the feedback initialization voltage Vini-FB corresponding to the third position TO1, thereby decreasing a ripple deviation of an initialization voltage and reducing a luminance deviation.

The common power circuit may include a first voltage division resistor string R1 and R2 connected to the first input terminal TER1, a second voltage division resistor string R3 and R4 connected to the second input terminal TER3, a converting circuit CIRC which selectively converts the final feedback driving voltage EVDD-FB and the feedback initialization voltage Vini-FB to selectively output the high level driving voltage EVDD-OUT and the initialization voltage Vini-OUT, a first switching circuit MUX1 which selectively connects the first voltage division resistor string R1 and R2 and the second voltage division resistor string R3 and R4 to the converting circuit CIRC on the basis of a MUX control signal MUX-CON, and a second switching circuit MUX2 which selectively connects an output terminal Nc of the converting circuit CIRC to the first output terminal TER2 and the second output terminal TER4 on the basis of the MUX control signal MUX-CON.

As in FIG. 16, when an on period of the data application scan signal SCAN includes a first period and a second period which are continuous, the timing control circuit TCON may generate the MUX control signal MUX-CON having a first level LV1 in the first period and may generate the MUX control signal MUX-CON having a second level LV2 differing from the first level LV1 in the second period. Here, the on period of the data application scan signal SCAN may be a one-horizontal period H1, and the one-horizontal period H1 may be defined as a time taken in charging a data voltage into pixels included in one horizontal pixel line.

In the first period, the first switching circuit MUX1 may connect the first voltage division resistor string R1 and R2 to the converting circuit CIRC on the basis of the MUX control signal MUX-CON having the first level LV1, and the second switching circuit MUX2 may connect the output terminal Nc of the converting circuit CIRC to the first output terminal TER2 on the basis of the MUX control signal MUX-CON having the first level LV1.

In the second period, the first switching circuit MUX1 may connect the second voltage division resistor string R3 and R4 to the converting circuit CIRC on the basis of the MUX control signal MUX-CON having the second level LV2, and the second switching circuit MUX2 may connect the output terminal Nc of the converting circuit CIRC to the second output terminal TER4 on the basis of the MUX control signal MUX-CON having the second level LV2.

The first switching circuit MUX1 may include a first terminal 1*a* connected to a first voltage division node Nx of the first voltage division resistor string R1 and R2, a second terminal 1*b* connected to a second voltage division node Ny of the second voltage division resistor string R3 and R4, and a third terminal which selectively connects the first terminal 1*a* and the second terminal 1*b* to the converting circuit CIRC on the basis of the MUX control signal MUX-CON.

The second switching circuit MUX2 may include a first terminal 2*a* connected to the first output terminal TER2, a second terminal 2*b* connected to the second output terminal TER4, and a third terminal which selectively connects the first terminal 2*a* and the second terminal 2*b* to the output terminal Nc of the converting circuit CIRC on the basis of the MUX control signal MUX-CON.

The converting circuit CIRC may include a first amplifier AMP1 which compares a reference voltage REF with the final feedback driving voltage EVDD-FB divided by the first voltage division node Nx of the first voltage division resistor string R1 and R2 or the feedback initialization voltage Vini-FB divided by the second voltage division node Ny of the second voltage division resistor string R3 and R4, a second amplifier AMP2 which compares an output of the first amplifier AMP1 with a ramp waveform RAMP to generate a PWM output waveform, a first controller CONL which outputs a first switch control signal and a second switch control signal having opposite phases on the basis of the PWM output waveform, a first output switch S1 which is connected between a high level source voltage VI and the first output node Na, a second output switch S2 which is connected between the first output node Na and a low level source voltage VSS, a first inductor L which is connected between the first output node Na and the output terminal Nc, and a first capacitor C which is connected between the output terminal Nc and the low level source voltage VSS.

In the vertical active period Vactive, the feedback control circuit FBCON may change the first feedback driving voltage EVDD-FB1 in a direction increasing from a target level and may change the second feedback driving voltage EVDD-FB2 in a direction increasing toward the target level. At this time, the feedback control circuit FBCON may oppositely change the first output contribution rate of the first feedback driving voltage EVDD-FB1 and the second output contribution rate of the second feedback driving voltage EVDD-FB2. In other words, the feedback control circuit FBCON may change the first output contribution rate of the first feedback driving voltage EVDD-FB1 in a direction decreasing from 100% to 0% and may change the second output contribution rate of the second feedback driving voltage EVDD-FB2 in a direction increasing from 0% to 100%.

A configuration of the feedback control circuit FBCON may be substantially the same as the descriptions of the first to fourth embodiments.

The embodiments of the present disclosure may realize the following effects.

According to the embodiments of the present disclosure, an image quality deviation caused by IR drop occurring in a high level driving voltage power line may be reduced.

Moreover, according to the embodiments of the present disclosure, an image quality deviation caused by IR drop occurring in the high level driving voltage power line and a luminance deviation caused by a ripple deviation of an initialization voltage occurring between a region including a notch and a region including no notch may be reduced.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An electroluminescence display apparatus comprising:

a display panel including a plurality of pixels connected to a first power line;

a first power circuit converting a final feedback driving voltage input through a first input terminal thereof to output a high level driving voltage to a first position of the first power line through a first output terminal thereof; and a feedback control circuit receiving the high level driving voltage as a first feedback driving voltage, receiving a second feedback driving voltage from a second position of the first power line, and supplying the first input terminal of the first power circuit with the final feedback driving voltage adjusted based on a first output contribution rate of the first feedback driving voltage and a second output contribution rate of the second feedback driving voltage, wherein a dynamic voltage (IR) drop at the second position of the first power line is greater than an IR drop at the first position of the first power line, and an output of the high level driving voltage increases in a vertical active period where a data application scan signal is supplied to the display panel, wherein the feedback control circuit comprises:

a control signal generating circuit generating a first output control signal for determining the first output contribution rate and a second output control signal for determining the second output contribution rate;

a first buffer receiving the first feedback driving voltage;

a second buffer receiving the second feedback driving voltage;

a first transistor connecting an output of the first buffer to the first input terminal of the first power circuit based on an on rate of the first transistor controlled according to the first output control signal; and a second transistor connecting an output of the second buffer to the first input terminal of the first power circuit based on an on rate of the second transistor controlled according to the second output control signal.

2. The electroluminescence display apparatus of claim 1, wherein, in the vertical active period, the first feedback driving voltage varies in a direction increasing from a target level, and the second feedback driving voltage varies in a direction increasing toward the target level.

3. The electroluminescence display apparatus of claim 1, wherein, in the vertical active period, the first output contribution rate and the second output contribution rate vary in a direction opposite to each other.

4. The electroluminescence display apparatus of claim 3, wherein the first output contribution rate varies in a first direction decreasing from 100% to 0%, and the second output contribution rate varies in a second direction increasing from 0% to 100%.

5. The electroluminescence display apparatus of claim 1, wherein each of the first transistor and the second transistor is implemented as an N-channel transistor, or each of the first transistor and the second transistor is implemented as a P-channel transistor.

6. The electroluminescence display apparatus of one of claim 1, further comprising:

a second power line connected to the plurality of pixels; and a second power circuit receiving a feedback initialization voltage from a third position of the second power line through a second input terminal thereof and converting the feedback initialization voltage to output an initialization voltage to a fourth position of the second power line through a second output terminal thereof, a number of horizontal-line pixels of the display panel corresponding to the third position is less than a number of horizontal-line pixels of the display panel corresponding to the fourth position, and in the vertical active period, the feedback initialization voltage has a certain target initialization level.

7. An electroluminescence display apparatus comprising:

a display panel including a plurality of pixels connected to a first power line;

a first power circuit converting a final feedback driving voltage input through a first input terminal thereof to output a high level driving voltage to a first position of the first power line through a first output terminal thereof; and a feedback control circuit receiving the high level driving voltage as a first feedback driving voltage, receiving a second feedback driving voltage from a second position of the first power line, and supplying the first input terminal of the first power circuit with the final feedback driving voltage adjusted based on a first output contribution rate of the first feedback driving voltage and a second output contribution rate of the second feedback driving voltage, wherein a dynamic voltage (IR) drop at the second position of the first power line is greater than an IR drop at the first position of the first power line, and an output of the high level driving voltage increases in a vertical active period where a data application scan signal is supplied to the display panel, wherein the feedback control circuit comprises:

a control signal generating circuit generating an output control signal for differently determining the first output contribution rate and the second output contribution rate;

a first buffer receiving the first feedback driving voltage;

a second buffer receiving the second feedback driving voltage;

a first transistor connecting an output of the first buffer to the first input terminal of the first power circuit based on an on rate of the first transistor controlled according to the output control signal; and a second transistor connecting an output of the second buffer to the first input terminal of the first power circuit based on an on rate of the second transistor controlled according to the output control signal.

8. The electroluminescence display apparatus of claim 7, wherein, when the first transistor is a P-channel transistor, the second transistor is an N-channel transistor, and when the first transistor is an N-channel transistor, the second transistor is a P-channel transistor.

9. An electroluminescence display apparatus comprising:

a display panel including a plurality of pixels connected to a first power line;

a first power circuit converting a final feedback driving voltage input through a first input terminal thereof to output a high level driving voltage to a first position of the first power line through a first output terminal thereof; and a feedback control circuit receiving the high level driving voltage as a first feedback driving voltage, receiving a second feedback driving voltage from a second position of the first power line, and supplying the first input terminal of the first power circuit with the final feedback driving voltage adjusted based on a first output contribution rate of the first feedback driving voltage and a second output contribution rate of the second feedback driving voltage, wherein a dynamic voltage (IR) drop at the second position of the first power line is greater than an IR drop at the first position of the first power line, and an output of the high level driving voltage increases in a vertical active period where a data application scan signal is supplied to the display panel, wherein the feedback control circuit comprises:

a control signal generating circuit generating a first output control signal for determining the first output contribution rate and a second output control signal for determining the second output contribution rate;

a first thin film transistor connecting the first feedback driving voltage to the first input terminal of the first power circuit based on an on rate of the first thin film transistor controlled according to the first output control signal, the first thin film transistor being positioned in the display panel; and a second thin film transistor connecting the second feedback driving voltage to the first input terminal of the first power circuit based on an on rate of the second thin film transistor controlled according to the second output control signal, the second thin film transistor being positioned in the display panel.

10. The electroluminescence display apparatus of claim 9, wherein each of the first thin film transistor and the second thin film transistor is implemented as an N-channel transistor, or each of the first thin film transistor and the second thin film transistor is implemented as a P-channel transistor.

11. An electroluminescence display apparatus comprising:

a display panel including a plurality of pixels connected to a first power line;

a first power circuit converting a final feedback driving voltage input through a first input terminal thereof to output a high level driving voltage to a first position of the first power line through a first output terminal thereof; and a feedback control circuit receiving the high level driving voltage as a first feedback driving voltage, receiving a second feedback driving voltage from a second position of the first power line, and supplying the first input terminal of the first power circuit with the final feedback driving voltage adjusted based on a first output contribution rate of the first feedback driving voltage and a second output contribution rate of the second feedback driving voltage, wherein a dynamic voltage (IR) drop at the second position of the first power line is greater than an IR drop at the first position of the first power line, and an output of the high level driving voltage increases in a vertical active period where a data application scan signal is supplied to the display panel, wherein the feedback control circuit comprises:

a control signal generating circuit generating an output control signal for determining the first output contribution rate and the second output contribution rate;

a first thin film transistor connecting the first feedback driving voltage to the first input terminal of the first power circuit based on an on rate of the first thin film transistor controlled according to the output control signal, the first thin film transistor being positioned in the display panel; and a second thin film transistor connecting the second feedback driving voltage to the first input terminal of the first power circuit based on an on rate of the second thin film transistor controlled according to the output control signal, the second thin film transistor being positioned in the display panel.

12. The electroluminescence display apparatus of claim 11, wherein, when the first thin film transistor is a P-channel transistor, the second thin film transistor is an N-channel transistor, and when the first thin film transistor is an N-channel transistor, the second thin film transistor is a P-channel transistor.

13. An electroluminescence display apparatus comprising:

a display panel including a plurality of pixels connected to a first power line and a second power line;

a common power circuit converting a final feedback driving voltage input through a first input terminal thereof to output a high level driving voltage to a first position of the first power line through a first output terminal thereof, receiving a feedback initialization voltage from a third position of the second power line through a second input terminal thereof, and converting the feedback initialization voltage to output an initialization voltage to a fourth position of the second power line through a second output terminal thereof; and a feedback control circuit receiving the high level driving voltage as a first feedback driving voltage, receiving a second feedback driving voltage from a second position of the first power line, and supplying the first input terminal of the common power circuit with the final feedback driving voltage adjusted based on a first output contribution rate of the first feedback driving voltage and a second output contribution rate of the second feedback driving voltage, wherein a dynamic voltage (IR) drop at the second position of the first power line is greater than IR drop at the first position of the first power line, a number of horizontal-line pixels of the display panel corresponding to the third position is less than a number of horizontal-line pixels of the display panel corresponding to the fourth position, and an output of the high level driving voltage increases in a vertical active period where a data application scan signal is supplied to the display panel, wherein the common power circuit comprises:

a first voltage division resistor string connected to the first input terminal of the common power circuit;

a second voltage division resistor string connected to the second input terminal of the common power circuit;

a converting circuit selectively converting the final feedback driving voltage and the feedback initialization voltage to selectively output the high level driving voltage and the initialization voltage;

a first switching circuit selectively connecting the first voltage division resistor string and the second voltage division resistor string to the converting circuit on the basis of a multiplexor control signal; and a second switching circuit selectively connecting an output terminal of the converting circuit to the first output terminal and the second output terminal of the common power circuit based on the multiplexor control signal.

14. The electroluminescence display apparatus of claim 13, wherein, in the vertical active period, the feedback initialization voltage has a certain target initialization level.

15. The electroluminescence display apparatus of claim 13, wherein an on period of the data application scan signal comprises a first period and a second period which are continuous, and the multiplexor control signal has a first level in the first period and has a second level differing from the first level in the second period.

16. The electroluminescence display apparatus of claim 15, wherein, in the first period, the first switching circuit connects the first voltage division resistor string to the converting circuit based on the multiplexor control signal having the first level, and the second switching circuit connects the output terminal of the converting circuit to the first output terminal of the common power circuit based on the multiplexor control signal having the first level, and in the second period, the first switching circuit connects the second voltage division resistor string to the converting circuit based on the multiplexor control signal having the second level, and the second switching circuit connects the output terminal of the converting circuit to the second output terminal of the common power circuit based on the multiplexor control signal having the second level.

* * * * *